US006985752B2

(12) United States Patent
Takano et al.

(10) Patent No.: US 6,985,752 B2
(45) Date of Patent: Jan. 10, 2006

(54) MOBILE COMMUNICATIONS SYSTEM, BASE STATION, MOBILE STATION, THRESHOLD SETTING METHOD AND STORAGE MEDIUM HAVING PROGRAM RECORDED THEREIN

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

(21) Appl. No.: 10/141,175

(22) Filed: May 9, 2002

(65) Prior Publication Data

US 2002/0173312 A1 Nov. 21, 2002

(30) Foreign Application Priority Data

May 17, 2001 (JP) .............................. 2001-147177
Dec. 5, 2001 (JP) .............................. 2001-370797

(51) Int. Cl.
*H04Q 7/20* (2006.01)
(52) U.S. Cl. ...................... 455/522; 370/335; 455/69; 455/560; 455/517
(58) Field of Classification Search ................ 455/423, 455/450, 456.4, 67.11, 69, 115.1, 226.1, 522, 455/550.1; 370/352, 342, 335; 37/342
See application file for complete search history.

(56) References Cited

U.S. PATENT DOCUMENTS

| | | | | |
|---|---|---|---|---|
| 5,982,760 | A * | 11/1999 | Chen | 370/335 |
| 6,195,551 | B1 * | 2/2001 | Kim et al. | 455/436 |
| 6,359,934 | B1 * | 3/2002 | Yoshida | 375/262 |
| 6,452,964 | B1 * | 9/2002 | Yoshida | 370/252 |
| 6,456,598 | B1 * | 9/2002 | Le Strat et al. | 455/69 |
| 6,529,482 | B1 * | 3/2003 | Lundby | 370/252 |
| 6,580,745 | B1 * | 6/2003 | Kondo | 375/130 |
| 6,628,924 | B1 * | 9/2003 | Miyamoto | 455/69 |
| 6,721,569 | B1 * | 4/2004 | Hashem et al. | 455/450 |
| 6,754,493 | B1 * | 6/2004 | Jetzek | 455/436 |
| 6,754,506 | B2 * | 6/2004 | Chang et al. | 455/522 |
| 6,799,053 | B2 * | 9/2004 | Miyoshi et al. | 455/522 |
| 2001/0040880 | A1 * | 11/2001 | Chen et al. | 370/337 |
| 2002/0057666 | A1 * | 5/2002 | Hamabe et al. | 455/522 |
| 2002/0080735 | A1 * | 6/2002 | Heath et al. | 455/67.1 |
| 2002/0119757 | A1 * | 8/2002 | Hamabe | 455/69 |
| 2002/0137520 | A1 * | 9/2002 | Dillon et al. | 455/453 |

(Continued)

FOREIGN PATENT DOCUMENTS

JP 5-183450 * 7/1993

(Continued)

OTHER PUBLICATIONS

Technical Report: 3rd Generation Partnership Project; Technical Specification Group Radio Access Network; Physical layer aspects of UTRA High Speed Downlink Packet Access, 3GPP TR 25.848, V4.0.0 (Mar. 2003).

(Continued)

*Primary Examiner*—Joseph Feild
*Assistant Examiner*—Kamran Afshar
(74) *Attorney, Agent, or Firm*—Sughrue Mion, PLLC

(57) ABSTRACT

A mobile communications system can easily set the optimum threshold for use in selecting a modulation-coding mode depending on a link condition. A selection control unit compares the reception quality of a common pilot signal detected by a mobile station with a plurality of thresholds stored in a threshold table, determines a modulation-coding mode to be selected, and outputs the determination result as a switch instruction. A threshold variable control unit variably controls the threshold level indicating the range of the link quality corresponding to the currently used modulation-coding mode based on the contents of the reception error notification from the mobile station.

90 Claims, 22 Drawing Sheets

U.S. PATENT DOCUMENTS

2002/0151311 A1 * 10/2002 Miyoshi et al. ............. 455/452

FOREIGN PATENT DOCUMENTS

| WO | WO 95/28814 A1 | 10/1995 |
| WO | WO 97/13388 A1 | 4/1997 |

OTHER PUBLICATIONS

H. Viswanathan et al., "Adaptive Coded Modulation over Slow Frequency-Selective Fading Channels", Vehicular Technology Conference, 1999, pp. 2388-2392 with Abstract.

* cited by examiner

MOBILE COMMUNICATIONS SYSTEM, BASE STATION, MOBILE STATION, THRESHOLD SETTING METHOD AND STORAGE MEDIUM HAVING PROGRAM RECORDED THEREIN

BACKGROUND OF THE INVENTION

1. Field of the Invention

The present invention relates to a mobile communications system, a base station, a mobile station, a threshold setting method therefor, and a storage medium having program of the method recorded therein, and more specifically to a method for setting a threshold for use in switching modulation-coding modes in a system in which an HS-PDSCH (High Speed-Physical Downlink Shared Channel) is used.

2. Description of the Related Art

Recently, in a mobile terminal (mobile station) such as a portable telephone unit or the like, multimedia technology has been introduced to process still pictures having a large volume of data, short-time moving pictures, etc., and a large capacity and high speed data transmission method is required correspondingly.

As the large capacity and high speed data transmission method, a PDSCH (Physical Downlink Shared Channel) system and an HS-PDSCH system, etc. in which only a downlink (from a base station to a mobile station) transmission rate is increased have been suggested.

In a mobile communications system for transmitting data from a base station to a mobile station using the above mentioned HS-PDSCH, any of a plurality of modulation-coding modes can be selected. Each of the modulation-coding modes is a combination of any of a plurality of modulation modes such as the QPSK (Quadrature Phase Shift Keying) for transmitting two bits (four values) in one modulating process, the 16QAM (16 Quadrature Amplitude Modulation) for transmitting four bits (sixteen values) in one modulating process, the 64QAM (64 Quadrature Amplitude Modulation) for transmitting six bits (sixty-four values) in one modulating process, etc. and any of a plurality of coding modes such as the ¾ rate error correction code having the redundancy of the ratio of 4/3 of a total number of bits to information bits with a check bit added, the ½ rate error correction code having the redundancy of the ratio of 2/1 of a total number of bits to information bits, etc.

A method for selecting any of the above mentioned modulation-coding modes can be a conventional method of selecting a modulation-coding mode depending on the reception quality of a common pilot signal after determining as a prefixed threshold the range of the reception quality [Ec/Io (energy per chip/interference wave power per unit frequency)] of the common pilot signal of a CPICH (Common Pilot Channel) which is transmitted from a base station to a mobile station.

In this case, the mobile station notifies the base station of a measurement result of the reception quality of the common pilot signal from the base station. The base station compares the reception quality of the common pilot signal obtained from the mobile station with the threshold, thereby selecting a modulation-coding mode depending on the reception quality.

Another method for selecting any of the modulation-coding modes can be a method of selecting a modulation-coding mode corresponding to the transmission power of an individual signal by determining as a prefixed threshold the range of the transmission power of the individual signal of a DPCH (Dedicated Physical Channel) of the downlink from the base station to the mobile station. In this case, the high-speed closed loop transmission power control is performed such that predetermined reception quality can be obtained in the mobile station for the downlink individual signal.

The TR (Technical Report) 25.848 V4.0.0 (March in 2001) of the 3GPP (third generation partnership project) describes the modulation-coding mode as the AMC (Adaptive Modulation and Coding). Prefixed values are set through simulation for the range of the reception quality of the common pilot signal, and the range of the transmission power of the individual signal.

In the above mentioned conventional mobile communications system, there is the problem that it is difficult to set the optimum range (threshold) of the reception quality of a common pilot signal corresponding to each modulation-coding mode when a modulation-coding mode is selected depending on the reception quality of a common pilot signal.

Although the same reception quality of a common pilot signal is set, the performance of a terminal can be different. Therefore, the reception error rate of a packet can also be different. As a result, there is also the problem that each terminal has a different optimum value for the threshold of the reception quality of a common pilot signal corresponding to each modulation-coding mode of each terminal.

The factor of determining the link condition can be a propagation loss, a multi-path environment (the number of paths and the size of each path), noise power (interference wave power and heat noise power), the moving speed of a mobile station, etc. Therefore, although the same reception quality of a common pilot signal is set, there can be any of the above mentioned different factors. As a result, a different optimum mode can be set for the HS-PDSCH depending on the multi-path environment and the moving speed of a mobile station. The optimum mode refers to the mode having the highest data transmission rate in the modes satisfying the target communications quality (block error rate, etc.).

On the other hand, in the case of the method of selecting a modulation-coding mode corresponding to the transmission power of an individual signal, there is no feedback delay due to the report of the reception quality of the above mentioned common pilot signal from a mobile station to a base station. Therefore, there is no influence of a feedback delay.

However, there is also the problem in this method that it is difficult to set the optimum range (threshold) of the transmission power of the individual signal corresponding to each modulation-coding mode. Furthermore, in this method, if a mobile station is located at the cell boundary, and soft handover is performed to set the dedicated physical channel for a plurality of base stations, then there can be a larger error from the actual downlink link quality on the assumption of the downlink link quality with the transmission power of the individual signal because no soft handover is performed in the data transmission using the above mentioned HS-PDSCH, but data is transmitted from one base station only.

SUMMARY OF THE INVENTION

The present invention has been developed to solve the above mentioned problems, and aims at providing a mobile communications system capable of easily setting the optimum threshold used in selecting a modulation-coding mode depending on the link condition, a base station, a mobile station, a threshold setting method used therefor, and a storage medium having program of the method recorded therein.

A mobile communications system according to the present invention can select any one of a plurality of modulation-coding modes used for data transmission of a unit of block between a base station controlled by a base station control device and a mobile station, and includes: measurement means for measuring link quality in the data transmission; selection means for selecting one mode from the modulation-coding modes depending on the link quality measured by the measurement means; detection means for detecting the occurrence of a reception error of each block in the data transmission; and variable control means for variably controlling a threshold used in selecting one mode from the modulation-coding modes by the selection means based on the detection result by the detection means.

A base station according to the present invention is controlled by a base station control device, performs the data transmission of data divided into blocks with a mobile station by using any one of the plurality of modulation-coding modes, and includes: selection means for selecting one mode from the modulation-coding modes depending on link quality in the data transmission; and variable control means for variably controlling a threshold for use in selecting one mode from the modulation-coding modes by the selection means based on the occurrence of a reception error of each block in the data transmission detected by the mobile station.

A mobile station according to the present invention to which abase station controlled by a base station control device performs the data transmission of data divided into blocks by using any one of a plurality of modulation-coding modes, includes: measurement means for measuring link quality in the data transmission; detection means for detecting the occurrence of a reception error of each block in the data transmission; selection means for selecting one mode from the modulation-coding modes depending on the link quality measured by the measurement means; and variable control means for variably controlling a threshold used by the selection means selecting one mode from the modulation-coding modes based on the detection result by the detection means.

A threshold setting method according to the present invention is a threshold setting method of a mobile communications system capable of selecting any one of a plurality of modulation-coding modes used for data transmission of a unit of block between a base station controlled by a base station control device and a mobile station, and includes: a step of measuring link quality in the data transmission; a step of selecting one mode from the modulation-coding modes depending on the measured link quality; a step of detecting the occurrence of a reception error of each block in the data transmission; and a step of variably controlling a threshold used in selecting one mode from the modulation-coding modes based on the detection result.

A storage medium according to the present invention is a storage medium having recorded therein a program of a threshold setting method of a base station in a mobile communications system capable of selecting any one of a plurality of modulation-coding modes used for data transmission of a unit of block between the base station controlled by a base station control device and a mobile station, and the program causes a computer to execute processing for selecting one mode from the transmission/reception modes depending on the measure result of link quality in the data transmission and processing for variably controlling a threshold used in selecting one mode from the transmission/reception modes based on the detection result of the occurrence of a reception error of each block in the data transmission.

That is, the mobile communications system according to the present invention capable of selecting any one of a plurality of modulation-coding modes switches the modulation-coding modes depending on the link quality of the radio link, and the level (threshold level) at which the modulation-coding mode is switched is controlled based on the occurrence of a reception error of each data block transmitted from the base station to the mobile station.

In the practical explanation, when the base station transmits an information block to the mobile station in the mobile communications system according to the present invention, the mobile station receives the information block. If there is a reception error for the information block, then the mobile station notifies the base station that the reception of the information block has failed.

The base station variably controls the threshold used for switching modulation-coding modes based on the occurrence of the reception error of the information block. That is, when the information block is successfully received, the threshold level indicating the range of the link quality corresponding to the currently used modulation-coding mode is lowered by a predetermined value $P_{down}$ dB. When the reception error of the information block occurs once or a predetermined number of times, the above mentioned threshold level is raised by a predetermined value $P_{up}$ dB.

The method for estimating the link quality can be, as described above, a method of using a measurement result of the reception quality of a common pilot signal reported from the mobile station, and a method of using a measurement result of transmission power of a downlink individual signal of a DPCH (Dedicated Physical Channel) for which a high-speed closed loop transmission power control is performed.

The values for use in raising/lowering the threshold level are defined as $P_{down} < P_{up}$. Furthermore, the values for use in raising/lowering the threshold level are determined depending on a target block error rate. In this case, assuming that the target block error rate is 1/N, the expression of $(N-1) P_{down} = P_{up}$ is set. For example, if the target block error rate is 10%, $P_{down}$ is 0.1, and $P_{up}$ is 0.9.

On the other hand, the method of raising/lowering the threshold level can also be a method of simultaneously raising/lowering all thresholds corresponding to the modulation-coding modes, and a method of independently raising/lowering each of the thresholds.

In the method of simultaneously raising/lowering the thresholds, when the threshold level indicating the range of the link quality corresponding to the currently used modulation-coding mode is lowered, all other threshold levels are lowered, and when the threshold level is raised, all other threshold levels are raised.

In the method of independently raising/lowering each of the thresholds, only the threshold level indicating the range of the link quality corresponding to the currently used modulation-coding mode is raised/lowered. In this case, when an information block is successfully received, the upper limit threshold level is lowered by a predetermined value $P_{down}$ dB, and when an information block is not successfully received a predetermined number of times, the lower limit threshold level is raised by a predetermined value $P_{up}$ dB.

As described above, when a threshold level is raised/lowered, the upper limit threshold level is not to be raised after the upper limit threshold level has raised up to a predetermined level when the modulation-coding mode at a minimum transmission rate is selected, and the lower limit threshold level is not to be lowered after the lower limit threshold level has lowered down to a predetermined level when the modulation-coding mode at a maximum transmission rate is selected.

Otherwise, when the difference between the threshold indicating the range of the link quality corresponding to the currently used modulation-coding mode and the current link quality is equal to or larger than a predetermined value $P_{max}$, the threshold level is not to be raised/lowered.

However, when the method of independently raising/lowering each threshold is used, in addition to the process in the above mentioned method, the following processes are performed. That is, if it occurs by lowering the upper limit threshold level when the difference between the upper limit threshold level and the lower limit threshold level becomes equal to or lower than a predetermined value, then the lower limit threshold level is lowered. On the other hand, if it occurs by raising the lower limit threshold level, then the upper limit threshold level is raised.

As described above, by variably controlling a threshold depending on the presence/absence of the occurrence of an error of an information block, a threshold for use in quickly switching modulation-coding modes depending on the link condition can be set. Therefore, the optimum threshold for use in selecting the modulation-coding mode can be easily set depending on the link condition.

On the other hand, in another mobile communications system according to the present invention, the threshold level is raised/lowered depending on whether a block error rate in a predetermined measurement period is higher or lower than a target block error rate. In this case, if the block error rate in the predetermined measurement period is higher than the target block error rate, then the threshold level is raised by a predetermined value $P_{up}$ dB, and if the block error rate in the predetermined measurement period is lower than the target block error rate, then the threshold level is lowered by a predetermined value $P_{down}$ dB.

Thus, since the threshold for use in quickly switching modulation-coding modes depending on the link condition can be set, the optimum threshold for use in selecting the modulation-coding mode can be easily set depending on the link condition.

It is also possible to raise a threshold when occurrence of a reception error is detected n times (n indicates an integer equal to or larger than 1), and lower the threshold when occurrence of a reception error is not detected m times (m indicates an integer expressed by n<m) continuously.

On the other hand, in another mobile communications system according to the present invention, when data transmitted and divided into blocks cannot be correctly received, it is retransmitted N times at maximum until it can be correctly received. In this system, the detection information about the presence/absence of a reception error on the retransmitted data is also used in controlling the threshold.

In this case, the size of a step of decreasing the threshold is set based on the number i of times of the retransmission, and the ratio $\Delta BR(=BR1/BR2)$ of the transmission rate BR1 in the current modulation-coding mode to the transmission rate BR2 in the modulation-coding mode one level lower than the current modulation-coding mode. That is, in case of (i+1)<$\Delta BR$, since there is a strong possibility that transmission can be completed faster by using the current modulation-coding mode even by performing the retransmission, the size of the step of changing a threshold is set to a positive value, thereby raising the probability of selecting the current modulation-coding mode or higher.

On the other hand, in case of (i+1)>$\Delta BR$, since there is a strong possibility that transmission can be completed faster by using the modulation-coding mode one level lower than the current mode, the size of a step of changing a threshold is set to a negative value, thereby raising the probability of selecting the mode lower by one than the current modulation-coding mode. Therefore, it is possible to set the optimum threshold to perform higher transmission with the retransmission taken into account.

In contrast, in another mobile communications system according to the present invention, the size of a step of controlling a threshold is set by the difference $\Delta Q$ (=Q−TH) between the current reception quality Q and the controlled threshold TH. That is, the larger the difference between the actual reception quality and the controlled threshold is, the faster convergence to the optimum threshold can be performed by a larger absolute value of the step size.

DESCRIPTION OF THE PREFERRED EMBODIMENTS

Figure 1:
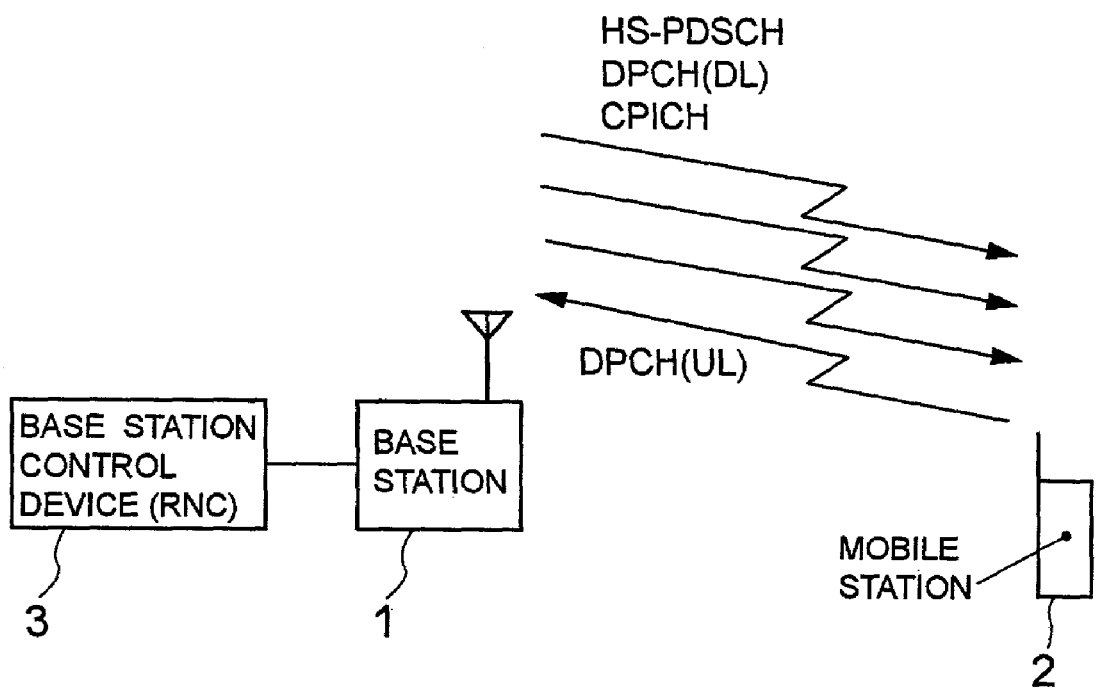
FIG. 1 is a block diagram of the configuration of the mobile communications system according to an embodiment of the present invention.

The embodiments of the present invention are described below by referring to the attached drawings. FIG. 1 is a block diagram of the configuration of the mobile communications system according to an embodiment of the present invention. In FIG. 1, the mobile communications system according to the embodiment of the present invention comprises a base station 1, a mobile station 2, and a base station control device [for example, an RNC (Radio Network Controller)] 3.

The base station 1 divides the data of the HS-PDSCH (High Speed-Physical Downlink Shared Channel) into data blocks and transmits the data blocks to the mobile station 2. Each block is assigned a CRC (Cyclic Redundancy Check) code (error detection code). Upon receipt of the data block of the HS-PDSCH, the mobile station 2 determines the presence/absence of a reception error of each data block using the CRC code, and notifies the base station 1 of the determination result.

In the above mentioned mobile communications system, any of the modulation-coding modes can be selected. Each of the modulation-coding modes [64QAM with R=3/4, 16QAM with R=3/4, QPSK with R=1/2 (described in TR25.848 V4.0.0 of 3GPP (March in 2001))] is a combination of any of a plurality of modulation modes such as the QPSK (Quadrature Phase Shift Keying) for transmitting two bits (four values) in one modulating process, the 16QAM (16 Quadrature Amplitude Modulation) for transmitting four bits (sixteen values) in one modulating process, the 64QAM (64 Quadrature Amplitude Modulation) for transmitting six bits (sixty-four values) in one modulating process, etc. and any of a plurality of coding modes such as the 3/4 rate error correction code having the redundancy of the ratio of 4/3 of a total number of bits to information bits with a check bit added, the 1/2 rate error correction code having the redundancy of the ratio of 2/1 of a total number of bits to information bits, etc. The above mentioned modulation-coding modes are normally switched based on the determination of the base station 1, but can also be switched by the mobile station 2 issuing an instruction to the base station 1 through the DPCH (Dedicated Physical Channel) of the uplink (UL).

When the base station 1 determines the switch of the modulation-coding modes, a notification is transmitted from the base station 1 to the mobile station 2 using the DPCH of the downlink (DL). After the notification of the switch of the modes, the modulation-coding modes are switched at a predetermined timing.

Figure 2:
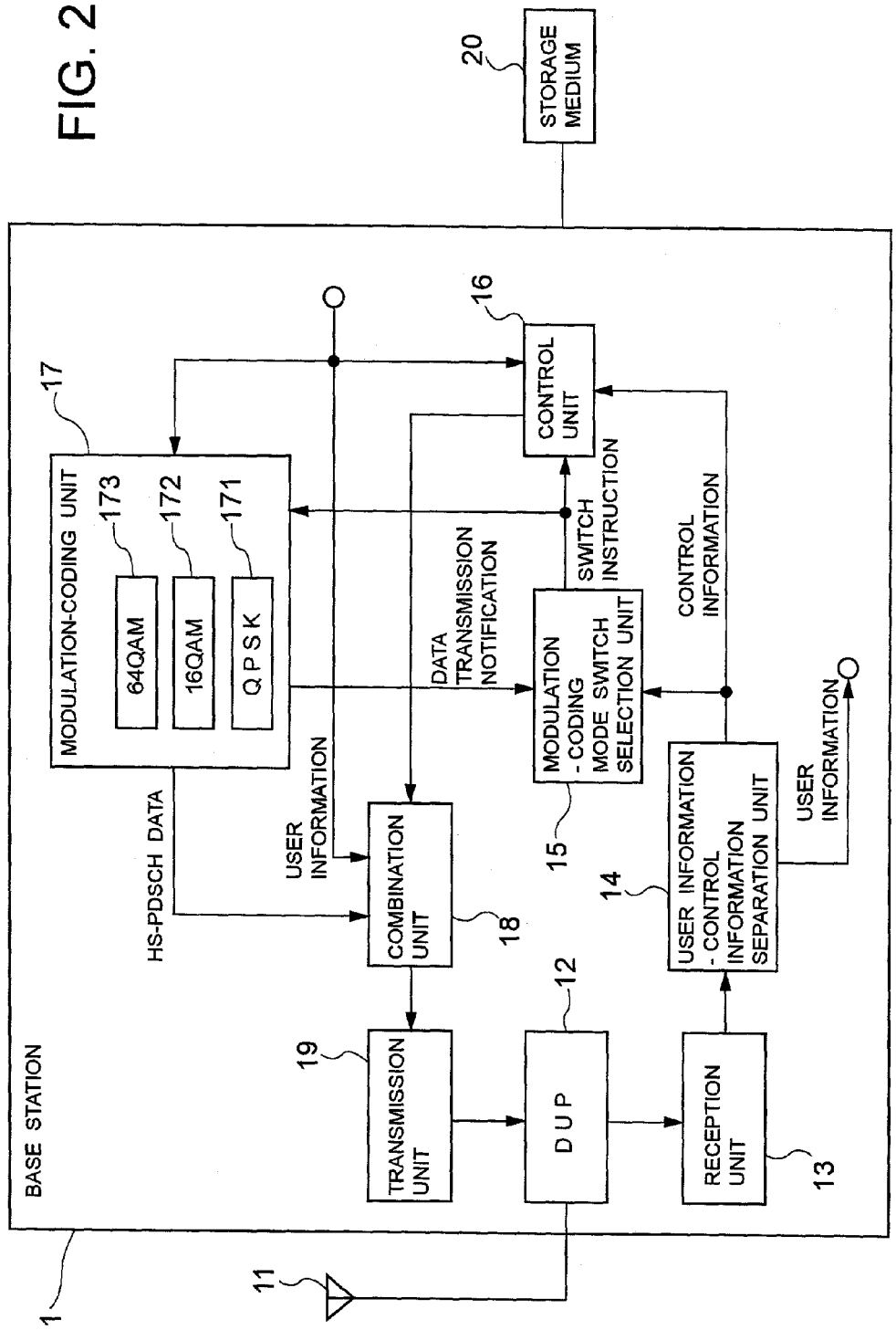
FIG. 2 is a block diagram of the configuration of the base station according to the first embodiment of the present invention.

FIG. 2 is a block diagram of the configuration of the base station 1 according to the first embodiment of the present invention. In FIG. 2, the base station 1 comprises an antenna 11, a duplexer (DUP) 12, a reception unit 13, a user information-control information separation unit 14, a modulation-coding mode switch selection unit 15, a control unit 16, a modulation-coding unit 17, a combination unit 18, a transmission unit 19, and a storage medium 20. Since a call control portion, a voice input/output portion, and a display portion of the base station 1 can be obtained from the conventional technology, their configurations and operations are omitted here.

The reception unit 13 transmits the signal [DPCH (UL), etc.] received through the antenna 11 and the duplexer 12 to the user information-control information separation unit 14. The user information-control information separation unit 14 separates the signal received from the reception unit 13 into user information (a voice signal, an image signal, etc.) and control information, transmits the user information to the above mentioned call control portion, voice output portion, and display portion, and the control information to the modulation-coding mode switch selection unit 15 and the control unit 16.

The modulation-coding mode switch selection unit 15 monitors a reception error notification from a mobile station not shown in FIG. 2 by executing the program stored in the storage medium 20, variably controls the threshold depending on the monitor result, determines which modulation-coding mode is to be selected depending on the current link quality using the threshold, and transmits a switch instruction for switching to the modulation-coding mode to the control unit 16 and modulation-coding unit 17.

The modulation-coding mode switch selection unit 15 sets in advance the value of the variable control of the threshold depending on a target block error rate. When the threshold is variably controlled, the value used in lowering the threshold level is set to $P_{down}$ while the value used in raising the threshold level is set to $P_{up}$. These values are expressed by $P_{down} < P_{up}$. In this case, if the target block error rate is 1/N, then the expression '$(N-1)P_{down} = P_{up}$' is set. For example, if the target block error rate is 10% and $P_{down}$ is 0.1, then $P_{up}$ is 0.9.

The control unit 16 generates various control signals based on the control information from the user information-control information separation unit 14 and the externally input information (for example, control information from a base station control device not shown in FIG. 2, etc.), and outputs the signals to control the respective portions in the base station 1 by executing the program stored on the storage medium 20. The storage medium 20 stores the program executed by each portion of the base station 1 including the control unit 16.

Furthermore, when the modulation-coding unit 17 switches the modes at a switch instruction from the modulation-coding mode switch selection unit 15, the control unit 16 generates control information including the mode switch information, and transmits it to the combination unit 18.

The modulation-coding unit 17 comprises a QPSK modulation-coding circuit 171, a 16QAM modulation-coding circuit 172, and a 64QAM modulation-coding circuit 173. The modulation-coding mode of the QPSK modulation-coding circuit 171 is the above mentioned QPSK with R=1/2. The modulation-coding mode of the 16QAM modulation-coding circuit 172 is the above mentioned 16QAM with R=3/4. The modulation-coding mode of the 64QAM modulation-coding circuit 173 is the above mentioned 64QAM with R=3/4.

In response to the switch instruction from the modulation-coding mode switch selection unit 15, the modulation-coding unit 17 switches to any of the QPSK modulation-coding circuit 171, the 16QAM modulation-coding circuit 172, and the 64QAM modulation-coding circuit 173, modulates and codes the user information using the switched-to circuit, and transmits the result as the data of HS-PDSCH to the combination unit 18.

The combination unit 18 combines the control information including the mode switch information from the control unit 16, the data of the HS-PDSCH from the modulation-coding unit 17, the input signals from the call control portion, the voice input portion, etc. of the base station 1, and issues the resultant signals as the DPCH (DL) and the HS-PDSCH from the antenna 11 through the transmission unit 19 and the duplexer 12.

Figure 3:
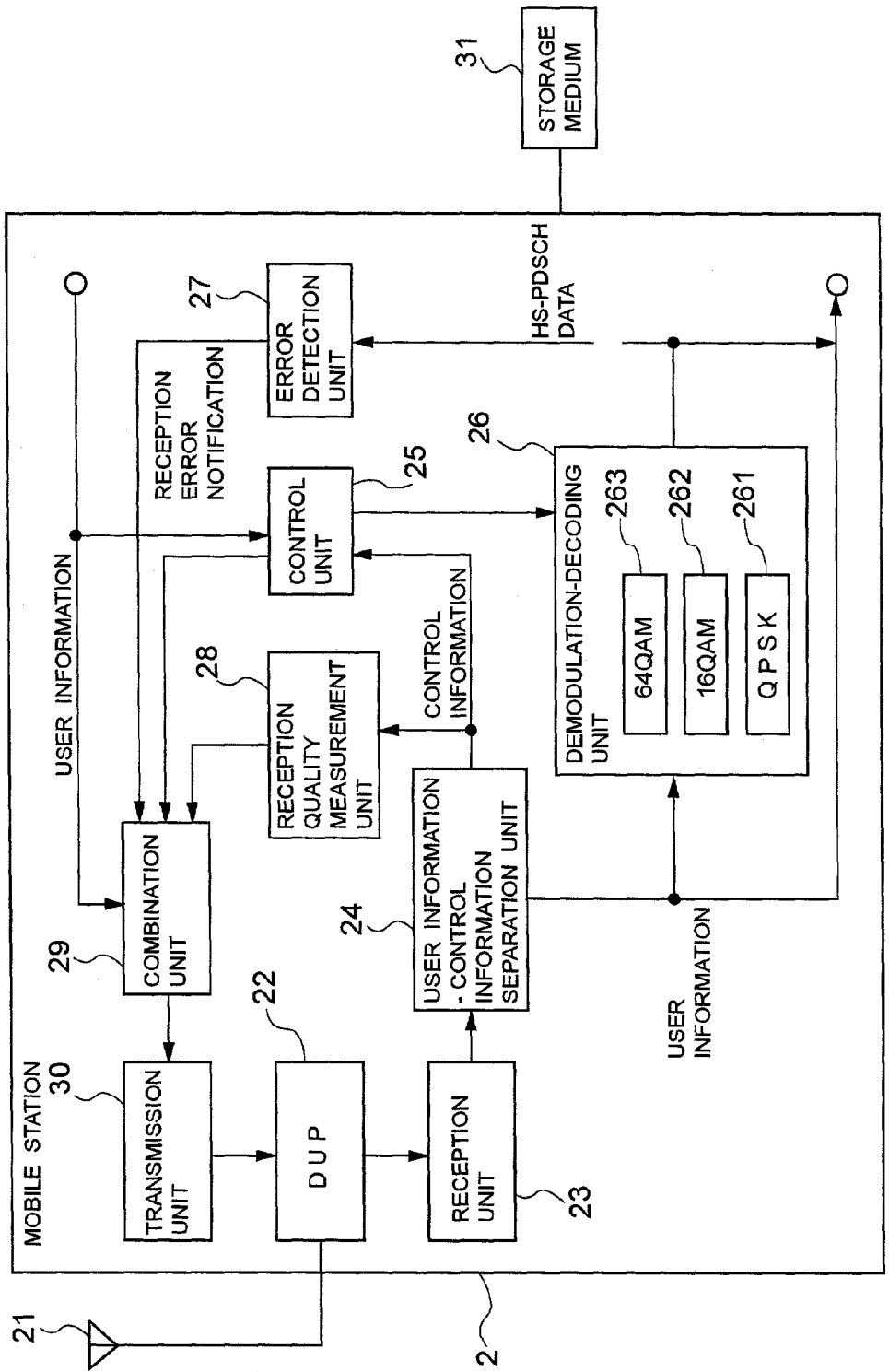
FIG. 3 is a block diagram of the configuration of the mobile station according to the first embodiment of the present invention.

FIG. 3 is a block diagram of the configuration of the mobile station 2 according to the first embodiment of the present invention. In FIG. 3, the mobile station 2 comprises an antenna 21, a duplexer (DUP) 22, a reception unit 23, a user information-control information separation unit 24, a control unit 25, a demodulation-decoding unit 26, an error detection unit 27, a reception quality measurement unit 28, a combination unit 29, a transmission unit 30, and a storage medium 31. Since a call control portion, a voice input/output portion, and a display portion of the mobile station 2 can be obtained from the conventional technology, their configurations and operations are omitted here.

The reception unit 23 transmits the signal {CPICH (Common Pilot Channel), DPCH, HS-PDSCH (Physical Downlink Shared Channel)} received through the antenna 21 and the duplexer 22 to the user information-control information separation unit 24.

The user information-control information separation unit 24 separates the received signal from the reception unit 23 into user information (a voice signal, an image signal, etc.) and control information, transmits the user information to the demodulation-decoding unit 26, and the call control portion, voice output portion, and display portion of the mobile station 2, and transmits the control information to the control unit 25.

The control unit 25 generates various control signals based on the control information from the user information-control information separation unit 24 and an external input information (for example, user information from a ten-key and the voice input portion), outputs the generated signals to control each unit in the mobile station 2 by executing the program stored on the storage medium 31, generates the control information to the base station 1, and transmits the information to the combination unit 29. The storage medium 31 stores the program executed by each unit of the mobile station 2 including the control unit 25.

The demodulation-decoding unit 26 comprises a QPSK demodulation-decoding circuit 261, a 16QAM demodulation-decoding circuit 262, and a 64QAM demodulation-decoding circuit 263, switches to any of the QPSK demodulation-decoding circuit 261, the 16QAM demodulation-decoding circuit 262, and the 64QAM demodulation-decoding circuit 263 in response to a switch instruction from the control unit 25, demodulates and decodes the user information from the user information-control information separation unit 24 by using the switched-to circuit, and outputs the data of the HS-PDSCH to the error detection unit 27 and each unit in the mobile station 2.

The error detection unit 27 determines the presence/absence of a reception error in each data block of the HS-PDSCH decoded by the demodulation-decoding unit 26 using the CRC code added to each data block, and outputs the determination result to the combination unit 29. The reception quality measurement unit 28 measures the reception quality [Ec/Io (energy per chip/interference wave power per unit frequency)] of the common pilot signal from the user information-control information separation unit 24, and outputs the measurement result to the combination unit 29.

The combination unit 29 combines the control information from the control unit 25, the determination result from the error detection unit 27, the measurement result from the reception quality measurement unit 28, an external input signal from the call control portion, the voice input portion of the mobile station 2, etc., and issues the result as the DPCH (UL) from the antenna 21 through the transmission unit 30 and the duplexer 22.

Figure 4:
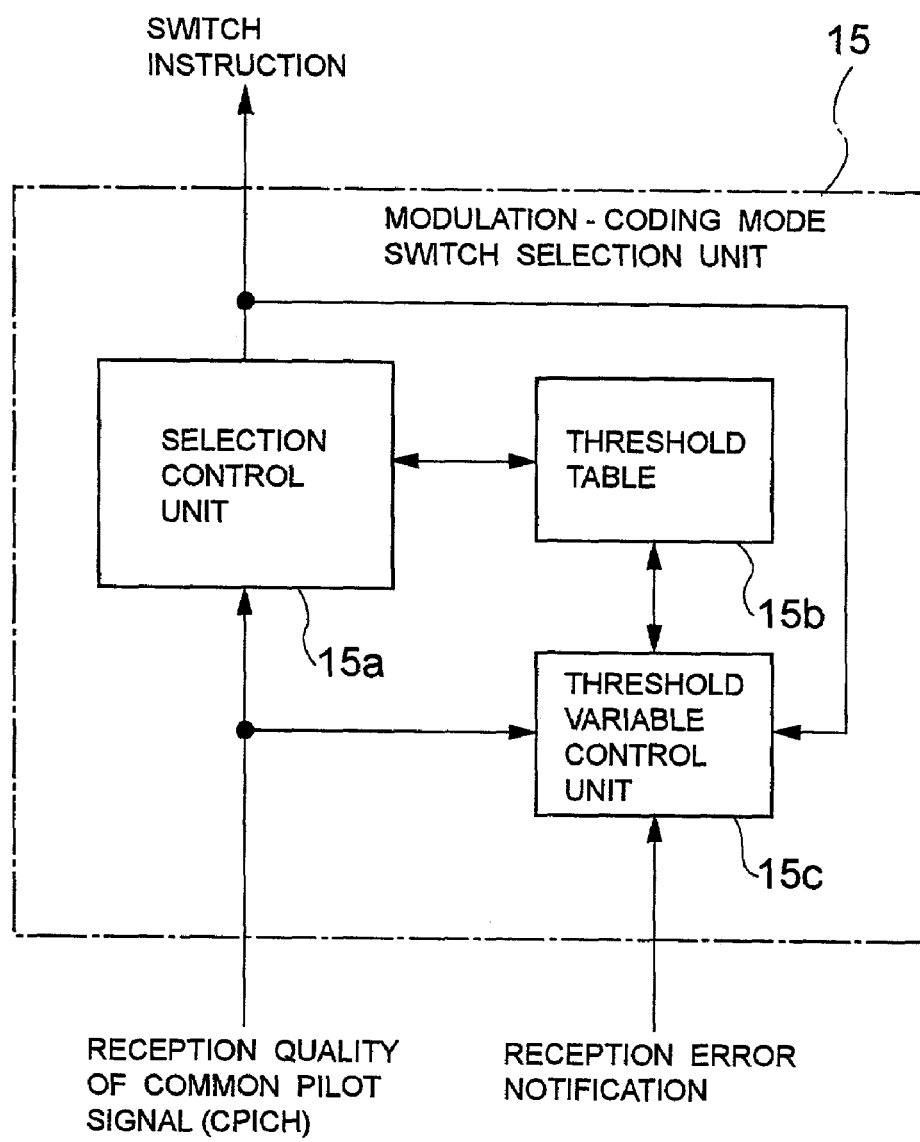
FIG. 4 is a block diagram of the configuration of the modulation-coding mode switch selection unit shown in FIG. 2.

FIG. 4 is a block diagram of the configuration of the modulation-coding mode switch selection unit 15 shown in FIG. 2. In FIG. 4, the modulation-coding mode switch selection unit 15 comprises a selection control unit 15a, a threshold table 15b, and a threshold variable control unit 15c.

The selection control unit 15a compares the measurement result of the reception quality of the common pilot signal (CPICH) from the reception quality measurement unit 28 of the mobile station 2 separated by the user information-control information separation unit 14 with a plurality of thresholds stored in the threshold table 15b, determines which modulation-coding mode is to be selected, and outputs the determined contents as a switch instruction. In this case, the selection control unit 15a specifies 'no change' if the selected modulation-coding mode is the same as in the previous process.

The threshold variable control unit 15c variably controls a plurality of thresholds stored in the threshold table 15b based on the contents of the reception error notification from the error detection unit 27 of the mobile station 2 separated by the user information-control information separation unit 14. That is, the threshold variable control unit 15c lowers the threshold level of the range of the link quality corresponding to the currently used modulation-coding mode by a predetermined value of $P_{down}$ dB when the information block is successfully received at the mobile station2, and raises the above mentioned threshold level by a predetermined value of $P_{up}$ dB when the information block is not successfully received a predetermined number of times. In this case, the threshold variable control unit 15c simultaneously raises and lowers all thresholds corresponding to the modulation-coding modes.

Figure 5:
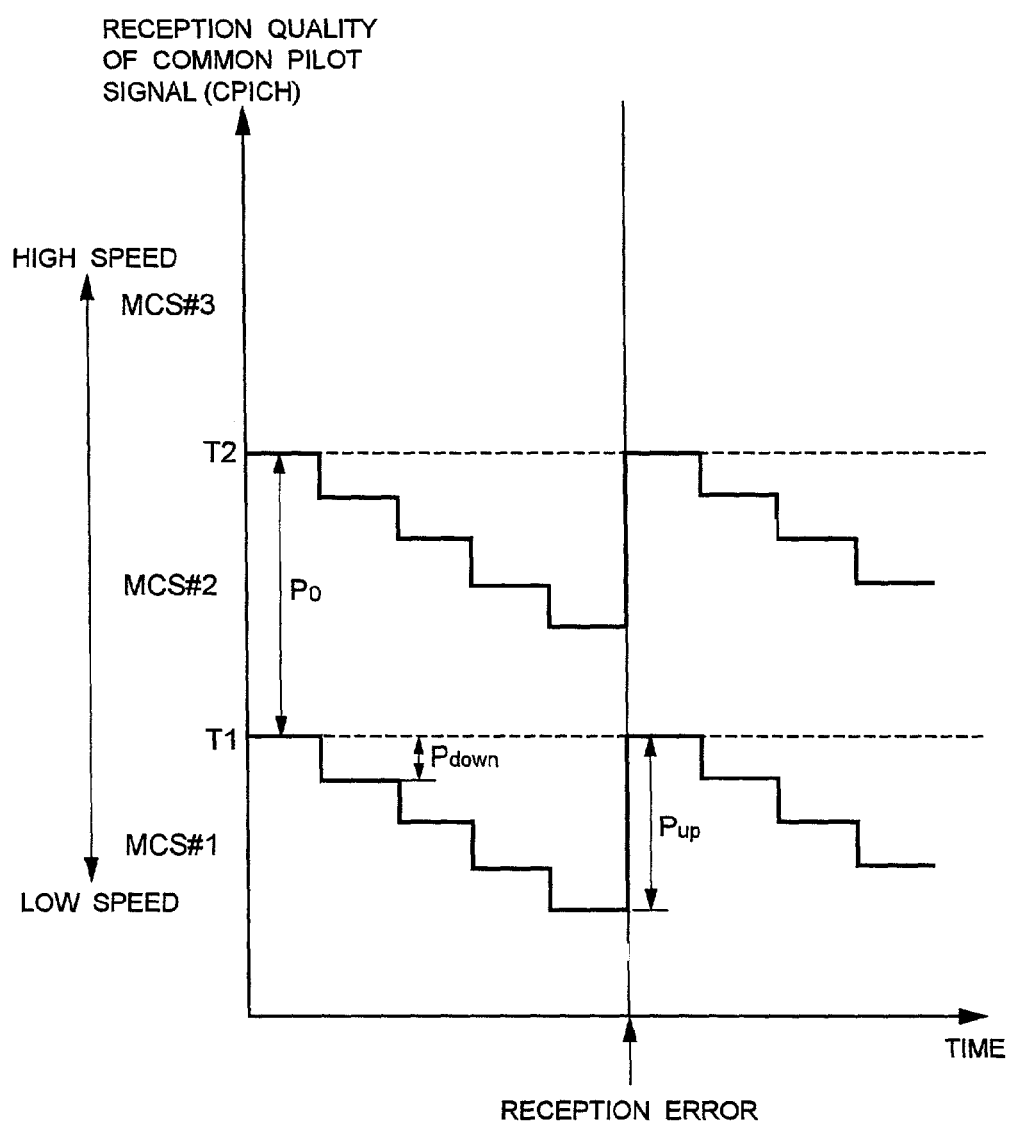
FIG. 5 shows the variable control of a threshold for use in switching modulation-coding modes by the threshold variable control unit shown in FIG. 4.
Figure 6:
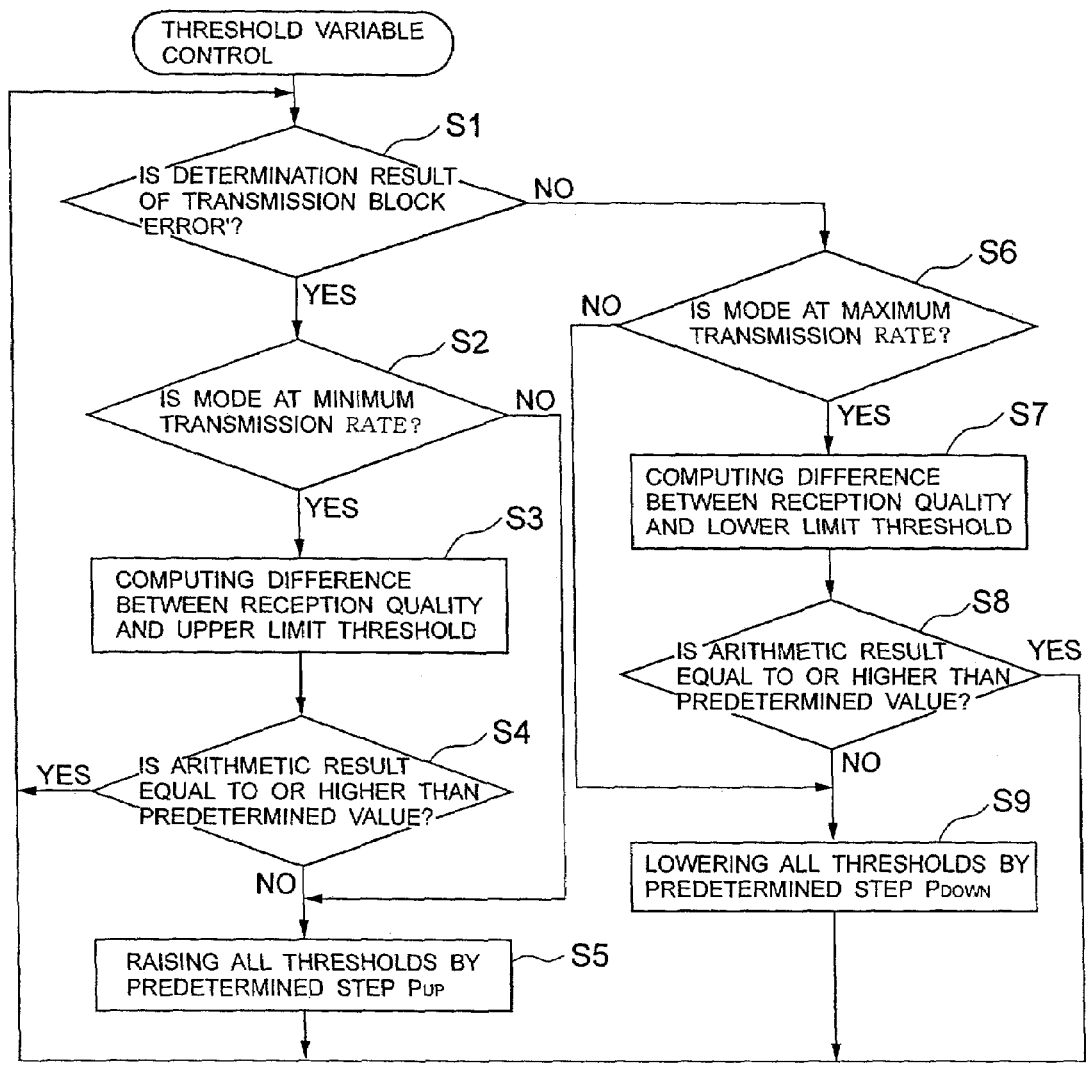
FIG. 6 is a flowchart of the variable control of a threshold for use in switching modulation-coding modes by the threshold variable control unit shown in FIG. 4.

FIG. 5 shows the variable control of the threshold for use in switching modulation-coding modes by the threshold variable control unit 15c shown in FIG. 4. FIG. 6 is a flowchart of the variable control of the threshold for use in switching modulation-coding modes by the threshold variable control unit 15c shown in FIG. 4. The variable control of the threshold for use in switching modulation-coding modes by the threshold variable control unit 15c is described below by referring to FIGS. 4 to 6. In the following explanation, the threshold is represented by T1 and T2, the modulation-coding mode by MCS (Modulation and Coding Set) #1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4.

Upon receipt of the reception error notification from the mobile station 2, the threshold variable control unit 15c computes (in step S3 shown in FIG. 6) the difference between the reception quality of the common pilot signal measured by the reception quality measurement unit 28 of the mobile station 2 and the upper limit threshold (for example, the upper limit threshold T1 of the modulation-coding mode MCS#1) of the currently used modulation-coding mode when the currently used modulation-coding mode is the mode at the minimum transmission rate (step S2 shown in FIG. 6) if the determination result of the transmission block is an 'error' (step S1 shown in FIG. 6).

If the arithmetic result is smaller than a predetermined value of $P_2$ (step S4 shown in FIG. 6), the threshold variable control unit 15c raises all thresholds T1 and T2 by the predetermined step $P_{up}$ (step S5 shown in FIG. 6), thereby returning control to step S1. If the arithmetic result is equal to or larger than the predetermined value of $P_2$ (step S4 shown in FIG. 6), then the threshold variable control unit 15c does not raise the thresholds T1 and T2 any more, thereby returning control to step S1.

If the currently used modulation-coding mode is not the mode at the minimum transmission rate (step S2 shown in FIG. 6), the threshold variable control unit 15c raises all thresholds T1 and T2 by the predetermined step $P_{up}$ (step S5 shown in FIG. 6), thereby returning control to step S1.

On the other hand, if the determination result of the transmission block is not an 'error' (step S1 shown in FIG. 6), then the threshold variable control unit 15c computes (in step S7 shown in FIG. 6) the difference between the reception quality measured by the reception quality measurement unit 28 of the mobile station 2 and the lower limit threshold T2 of the currently used modulation-coding mode when the currently used modulation-coding mode is the mode at the maximum transmission rate (step S6 shown in FIG. 6).

If the arithmetic result is smaller than a predetermined value of $P_1$ (step S8 shown in FIG. 6), the threshold variable control unit 15c lowers all thresholds T1 and T2 by the predetermined step $P_{down}$ (step S9 shown in FIG. 6), thereby returning control to step S1. If the arithmetic result is equal to or larger than the predetermined value of $P_1$ (step S8 shown in FIG. 6), then the threshold variable control unit 15c does not lower the thresholds T1 and T2 any more, thereby returning control to step S1.

If the currently used modulation-coding mode is not the mode at the maximum transmission rate (step S6 shown in FIG. 6), the threshold variable control unit 15c lowers all thresholds T1 and T2 by the predetermined step $P_{down}$ (step S9 shown in FIG. 6), thereby returning control to step S1. All thresholds T1 and T2 are raised or lowered such that they can be spaced by a predetermined value of $P_0$ as shown in FIG. 5.

Figure 7:
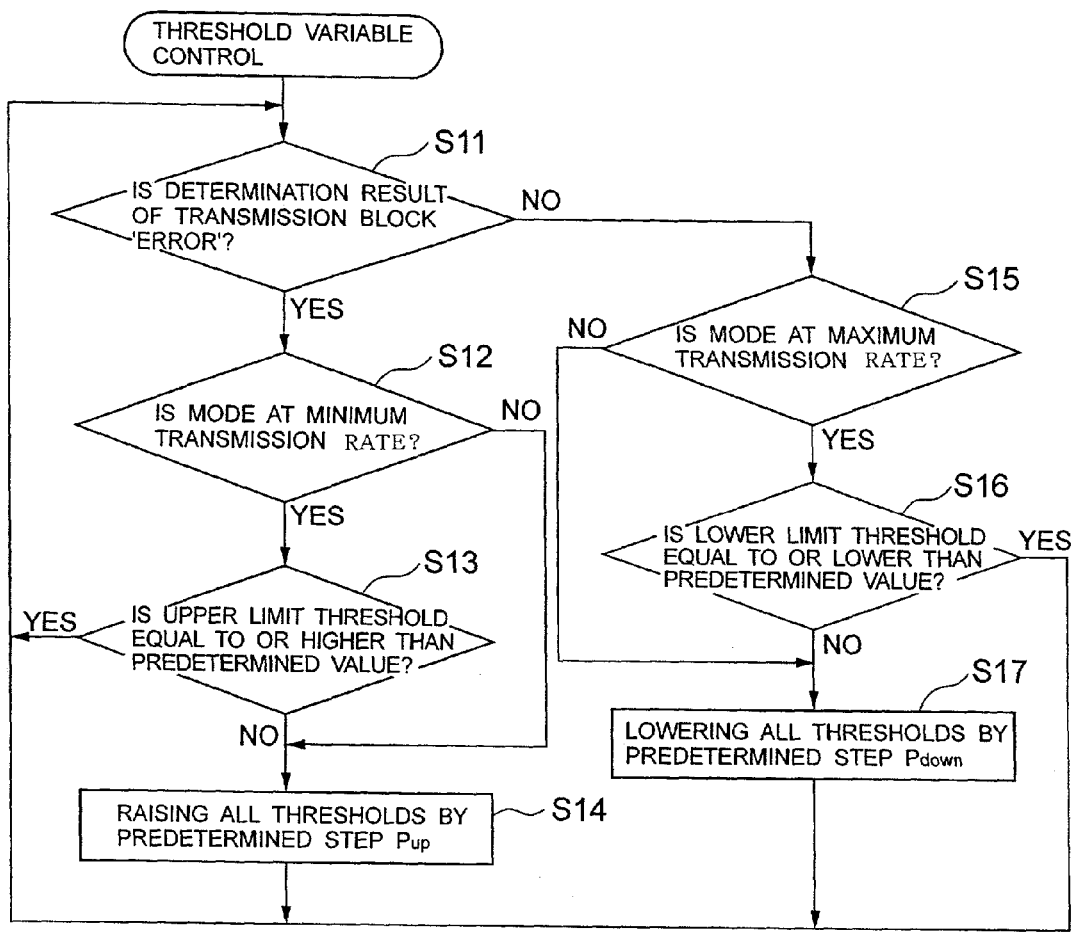
FIG. 7 is a flowchart showing another example of the variable control of a threshold for use in switching modulation-coding modes by the threshold variable control unit shown in FIG. 4.

FIG. 7 is a flowchart showing another example of the variable control of the threshold for use in switching modulation-coding modes by the threshold variable control unit 15c shown in FIG. 4. The variable control of the threshold for use in switching modulation-coding modes by the threshold variable control unit 15c is described below by referring to FIGS. 4 and 7.

Upon receipt of a reception error notification from the mobile station 2, the threshold variable control unit 15c raises all thresholds T1 and T2 by the predetermined step $P_{up}$ (step S14 shown in FIG. 7) if the determination result of the transmission block is an 'error' (step S11 shown in FIG. 7), and the currently used modulation-coding mode is not a mode at the minimum transmission rate (step S12 shown in FIG. 7), or if, although the currently used modulation-coding mode is a mode at the minimum transmission rate (step S12 shown in FIG. 7), the upper limit threshold of the mode is lower than a predetermined value (step S13 shown in FIG. 7), thereby returning control to step S11.

If the currently used modulation-coding mode is a mode at the minimum transmission rate (step S12 shown in FIG. 7), and the upper limit threshold is equal to or larger than the predetermined value (step S13 shown in FIG. 7), then the threshold variable control unit 15c does not raise the thresholds T1 and T2 any more, thereby returning control to step S11.

On the other hand, the threshold variable control unit 15c lowers all thresholds T1 and T2 by the predetermined step $P_{down}$ (step S17 shown in FIG. 7) if the determination result of the transmission block is not an 'error' (step S11 shown in FIG. 7), and the currently used modulation-coding mode is not a mode at the maximum transmission rate (step S15 shown in FIG. 7), or if, although the currently used modulation-coding mode is a mode at the maximum transmission rate (step S15 shown in FIG. 7), the lower limit threshold of the mode is higher than a predetermined value (step S16 shown in FIG. 7), thereby returning control to step S11.

If the currently used modulation-coding mode is a mode at the maximum transmission rate (step S15 shown in FIG. 7), and the lower limit threshold of the mode at the maximum transmission rate is equal to or smaller than the predetermined value (step S16 shown in FIG. 7), then the threshold variable control unit 15c does not lower the thresholds T1 and T2 any more, thereby returning control to step S11.

Thus, since the base station 1 variably controls the thresholds T1 and T2 depending on the presence/absence of error occurrence of an information block, the modulation-coding modes MCS#1, MCS#2, and MCS#3 can be switched depending on the change of the link quality (the reception quality of a common pilot signal (CPICH) according to the present embodiment).

Furthermore, since the base station 1 variably controls all thresholds T1 and T2 simultaneously, the upper limit threshold of the currently used modulation-coding mode is lowered if acceptable link quality can be obtained for the currently used modulation-coding mode MCS#1, MCS#2, MCS#3 although the change of the link quality is small, thereby successfully transferring to a modulation-coding mode one level higher than the currently used mode. As a result, a modulation-coding mode at the highest possible speed can be constantly selected.

Furthermore, when a determination error occurs in a block, the modulation-coding mode one level lower than the currently used mode can be immediately entered because $P_{up}$ is larger than $P_{down}$. Therefore, although the link quality is lowered, continuous block errors can be prevented, thereby enhancing the throughput of the system.

In addition, since the width ($P_{down}$ and $P_{up}$) of the variable control of the threshold is set based on the target block error rate in the base station 1, the target block error rate can be attained.

Therefore, since a threshold for use in quickly switching modulation-coding modes can beset depending on the link condition according to the first embodiment of the present invention, the optimum threshold for use in selecting a modulation-coding mode can be easily set depending on the link condition.

According to the present embodiment, there are three modulation-coding modes. However, the number is not limited to three. That is, there also can be four or more modulation-coding modes. In this case, an optional mode can be set as a mode at the minimum transmission rate or the maximum transmission rate.

Furthermore, the variable control of a threshold can also be set at an instruction of the mobile station 2. In this case, the threshold variable control unit 15c for variably controlling a threshold depending on the presence/absence of the occurrence of a reception error of an information block is provided in the mobile station 2, and an instruction to raise/lower the threshold level is to be transmitted from the mobile station 2 to the base station 1.

It is also possible to raise a threshold when the reception error occurs n times (n is an integer equal to or larger than 1), and lower it when no reception error occurs continuously m times (m is an integer, and n<m).

Figure 8:
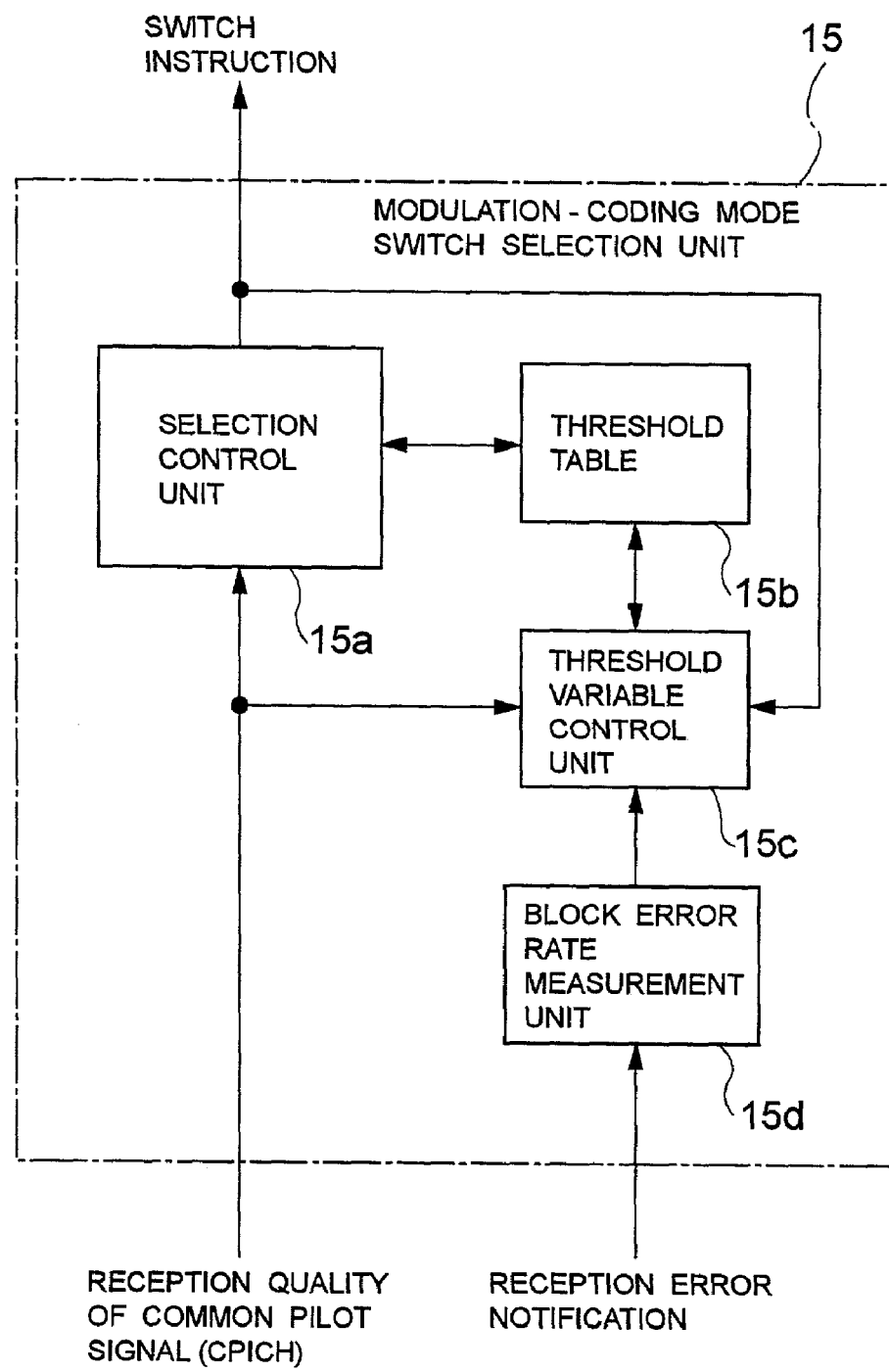
FIG. 8 is a block diagram of the configuration of the modulation-coding mode switch selection unit according to the second embodiment of the present invention.

FIG. 8 is a block diagram of the configuration of the modulation-coding mode switch selection unit according to the second embodiment of the present invention. In FIG. 8, the second embodiment of the present invention is configured by providing a block error rate measurement unit 15d for the modulation-coding mode switch selection unit 15 shown in FIG. 4. That is, the modulation-coding mode switch selection unit 15 comprises the selection control unit 15a, the threshold table 15b, the threshold variable control unit 15c, and the block error rate measurement unit 15d.

The block error rate measurement unit 15d measures the reception error rate of information blocks in a preset time based on the contents of the reception error notification from the mobile station 2 separated by the user information-control information separation unit 14, and transmits the reception error rate to the threshold variable control unit 15c.

The threshold variable control unit 15c variably controls a plurality of thresholds stored in the threshold table 15b based on the reception error rate from the block error rate measurement unit 15d. That is, the threshold variable control unit 15c raises the threshold level by a predetermined value of $P_{up}$ dB if the block error rate in the predetermined measurement period is higher than a target block error rate, and lowers the threshold level by a predetermined value of $P_{down}$ dB if the block error rate in the predetermined measurement period is lower than the target block error rate. In this case, the threshold variable control unit 15c simultaneously raises/lowers all thresholds corresponding to the modulation-coding modes.

Although not shown in the attached drawings, the second embodiment according to the present invention is configured as in the mobile communications system shown in FIG. 1, and has the same configurations of the base station 1 according to the first embodiment of the present invention shown in FIG. 2 and the mobile station 2 according to the first embodiment of the present invention shown in FIG. 3. Therefore, the descriptions of them are omitted here.

Figure 9:
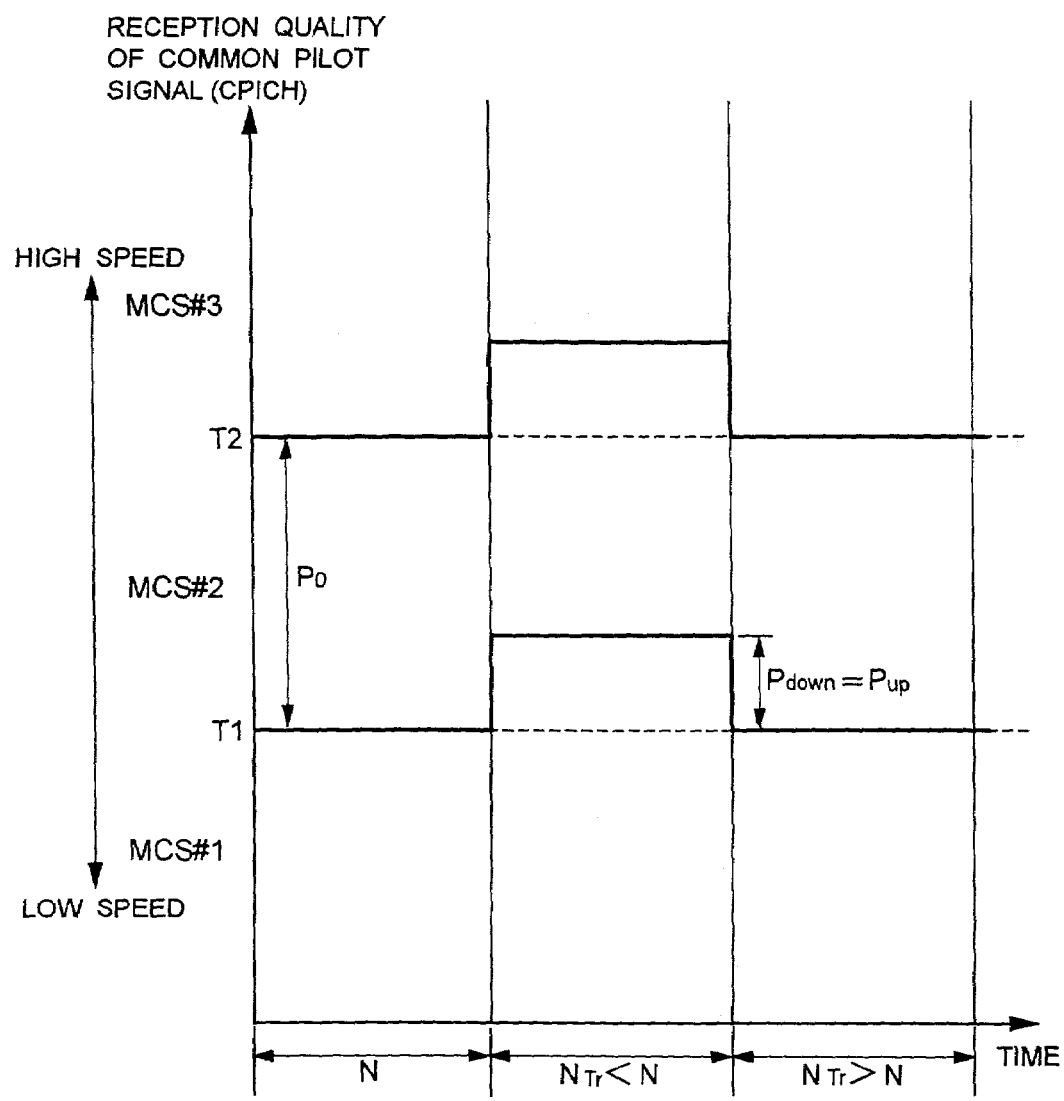
FIG. 9 shows the variable control of a threshold for use in switching modulation-coding modes by the modulation-coding mode switch selection unit shown in FIG. 8.
Figure 10:
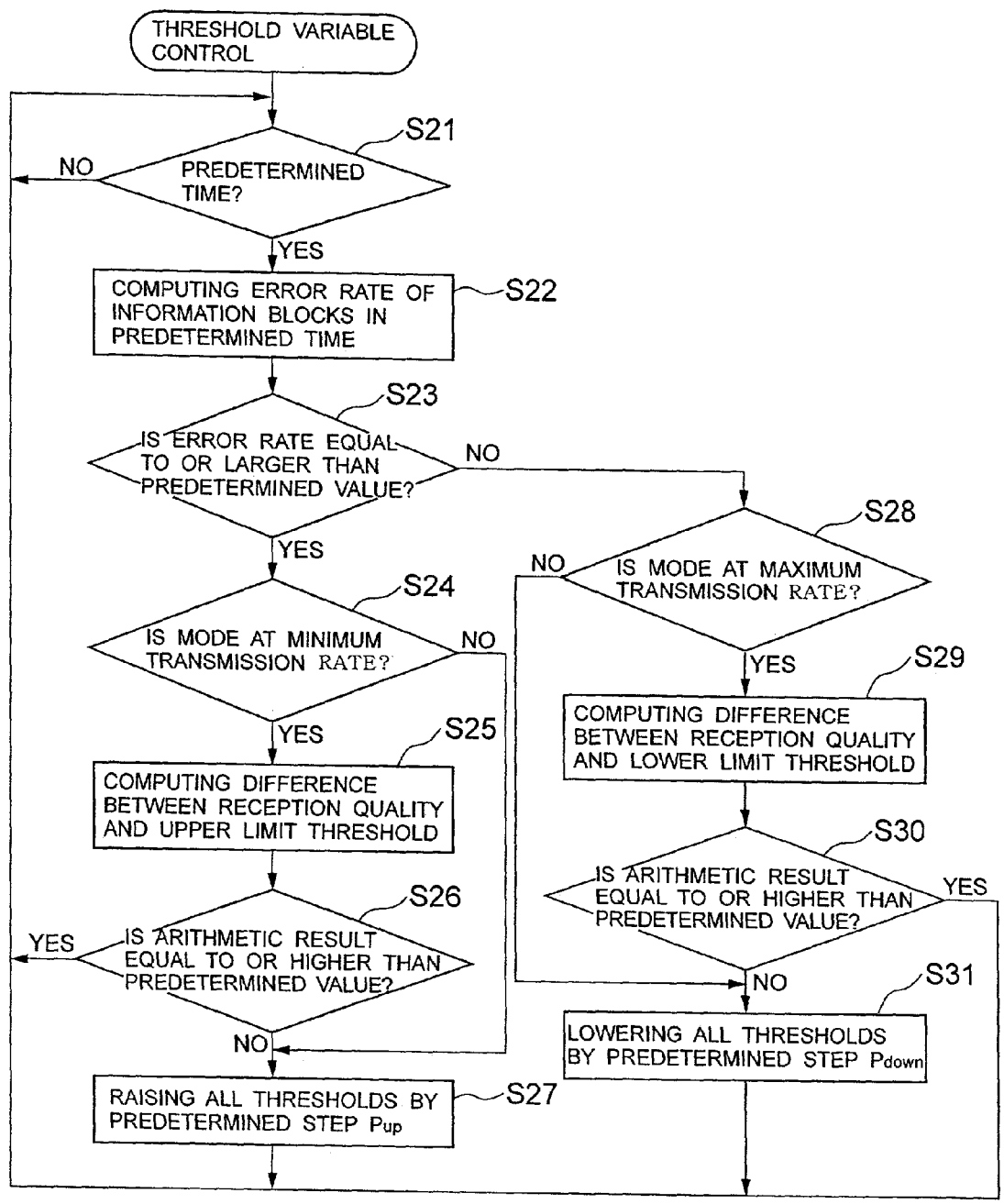
FIG. 10 is a flowchart of variable control of a threshold for use in switching modulation-coding modes by the modulation-coding mode switch selection unit shown in FIG. 8.

FIG. 9 shows the variable control of the threshold for use in switching modulation-coding modes by the modulation-coding mode switch selection unit 15 shown in FIG. 8. FIG. 10 is a flowchart of the variable control of the threshold for use in switching modulation-coding modes by the modulation-coding mode switch selection unit 15 shown in FIG. 8. The variable control of the threshold for use in switching modulation-coding modes by the modulation-coding mode switch selection unit 15 is described below by referring to FIGS. 8 to 10. In the following explanation, the threshold is represented by T1 and T2, the modulation-coding mode by MCS#1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4.

At a predetermined time (step S21 shown in FIG. 10), the block error rate measurement unit 15d of the modulation-coding mode switch selection unit 15 computes the reception error rate of information blocks in the predetermined time (step S22 shown in FIG. 10).

If the reception error rate computed by the block error rate measurement unit 15d is equal to or larger than a predetermined value (step S23 shown in FIG. 10), then the threshold variable control unit 15c computes the difference between the reception quality measured by the reception quality measurement unit 28 of the mobile station 2 and the upper limit threshold T1 of the currently used modulation-coding mode (step S25 shown in FIG. 10) when the currently used modulation-coding mode is a mode at the minimum transmission rate (step S24 shown in FIG. 10).

If the arithmetic result is smaller than a predetermined value of $P_2$ (step S26 shown in FIG. 10), the threshold variable control unit 15c raises all thresholds T1 and T2 by a predetermined step $P_{up}$ (step S27 shown in FIG. 10), thereby returning control to step S21. If the arithmetic result is equal to or larger than the predetermined value of $P_2$ (step S26 shown in FIG. 10), then the thresholds T1 and T2 are not raised any more, thereby returning control to step S21.

If the currently used modulation-coding mode is not the mode at the minimum transmission rate (step S24 shown in FIG. 10), the threshold variable control unit 15c raises all thresholds T1 and T2 by the predetermined step $P_{up}$ (step S27 shown in FIG. 10), thereby returning control to step S21.

On the other hand, if the reception error rate computed by the block error rate measurement unit 15d is smaller than a predetermined value (step S23 shown in FIG. 10), then the threshold variable control unit 15c computes (in step S29 shown in FIG. 10) the difference between the reception quality measured by the reception quality measurement unit 28 of the mobile station 2 and the lower limit threshold T2 of the currently used modulation-coding mode when the currently used modulation-coding mode is a mode at the maximum transmission rate (step S28 shown in FIG. 10).

If the arithmetic result is smaller than a predetermined value of $P_1$ (step S30 shown in FIG. 10), the threshold variable control unit 15c lowers all thresholds T1 and T2 by a predetermined step $P_{down}$ (step S31 shown in FIG. 10), thereby returning control to step S21. If the arithmetic result is equal to or larger than the predetermined value of $P_1$ (step S30 shown in FIG. 10), then the threshold variable control unit 15c does not lower the thresholds T1 and T2 any more, thereby returning control to step S21.

If the currently used modulation-coding mode is not the mode at the maximum transmission rate (step S28 shown in FIG. 10), the threshold variable control unit 15c lowers all thresholds T1 and T2 by the predetermined step $P_{down}$ (step S31 shown in FIG. 10), thereby returning control to step S21. All thresholds T1 and T2 are raised or lowered such that they can be spaced by a predetermined value of $P_0$ as shown in FIG. 9. Additionally, assuming that the value when the threshold level is lowered is $P_{down}$ and the value when the threshold level is raised is $P_{up}$, the values are expressed by $P_{down}=P_{up}$.

Figure 11:
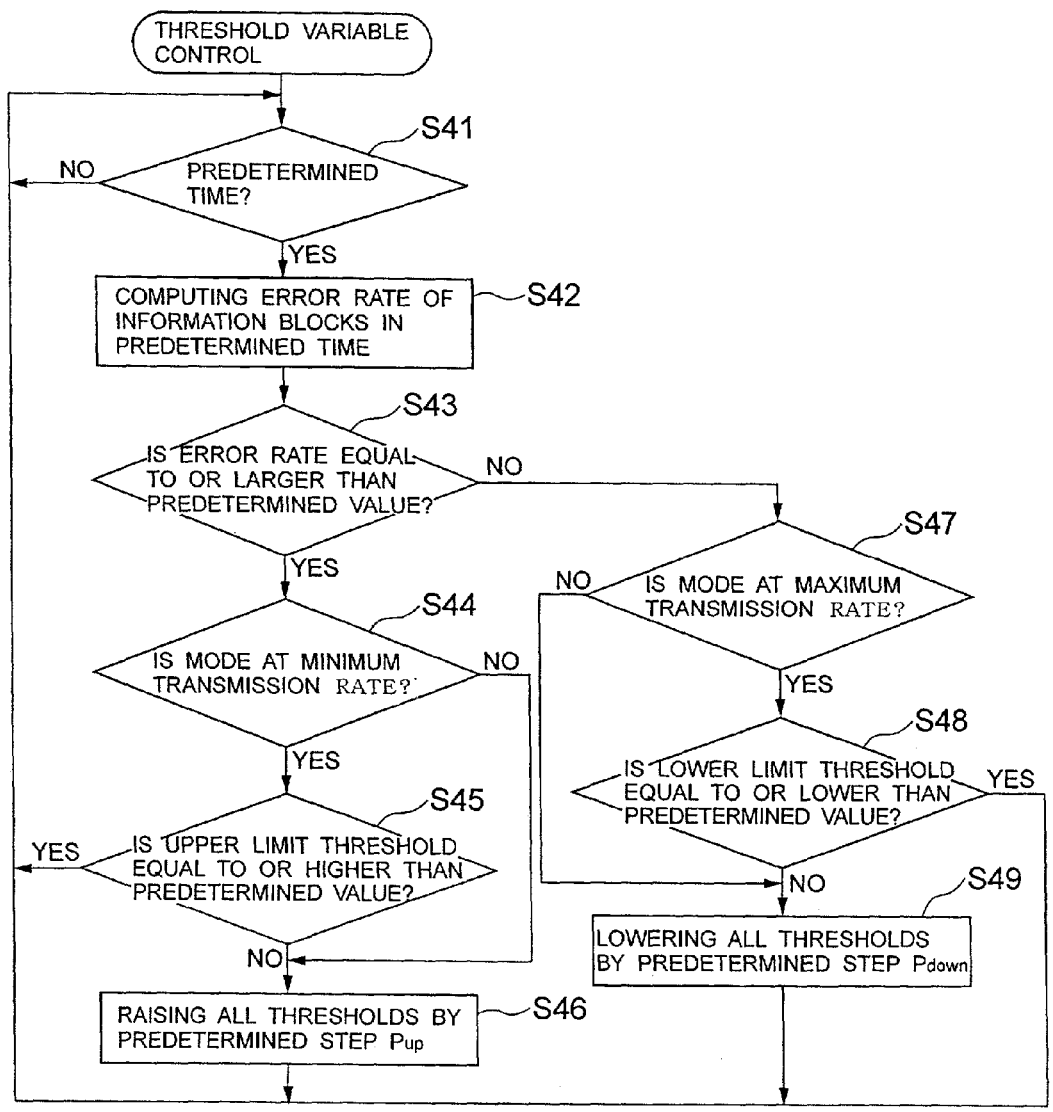
FIG. 11 is a flowchart of another example of variable control of a threshold for use in switching modulation-coding modes by the modulation-coding mode switch selection unit shown in FIG. 8.

FIG. 11 is a flowchart showing another example of the variable control of the threshold for use in switching modulation-coding modes by the modulation-coding mode switch selection unit 15 shown in FIG. 8. Another example of the variable control of the threshold for use in switching modulation-coding modes by the modulation-coding mode switch selection unit 15 is described below by referring to FIGS. 8 and 11.

At a predetermined time (step S41 shown in FIG. 11), the block error rate measurement unit 15d of the modulation-coding mode switch selection unit 15 computes the reception error rate of information blocks in the predetermined time (step S42 shown in FIG. 11).

The threshold variable control unit 15c raises all thresholds T1 and T2 by a predetermined step $P_{up}$ (step S46 shown in FIG. 11) when the reception error rate computed by the block error rate measurement unit 15d is equal to or larger than a predetermined value ($N_{Tr} \leq N$) (step S43 shown in FIG. 11), and if the currently used modulation-coding mode is not a mode at the minimum transmission rate (step S44 shown in FIG. 11), or if, although the currently used modulation-coding mode is a mode at the minimum transmission rate (step S44 shown in FIG. 11), the upper limit threshold of the mode is lower than a predetermined value (step S45 shown in FIG. 11), thereby returning control to step S41.

If the currently used modulation-coding mode is a mode at the minimum transmission rate (step S44 shown in FIG. 11), and the upper limit threshold of the mode is equal to or larger than a predetermined value (step S45 shown in FIG. 11), then the threshold variable control unit 15c does not raise the thresholds T1 and T2 any more, thereby returning control to step S41.

The threshold variable control unit 15c lowers all thresholds T1 and T2 by a predetermined step $P_{down}$ (step S49 shown in FIG. 11) when the reception error rate computed by the block error rate measurement unit 15d is smaller than a predetermined value ($N_{Tr} > N$) (step S43 shown in FIG. 11), and if the currently used modulation-coding mode is not a mode at the maximum transmission rate (step S47 shown in FIG. 11), or if, although the currently used modulation-coding mode is a mode at the maximum transmission rate (step S47 shown in FIG. 11), the lower limit threshold of the mode is higher than a predetermined value (step S48 shown in FIG. 11), thereby returning control to step S41.

If the currently used modulation-coding mode is a mode at the maximum transmission rate (step S47 shown in FIG. 11), and the lower limit threshold of the mode is equal to or smaller than a predetermined value (step S48 shown in FIG. 11), then the threshold variable control unit 15c does not lower the thresholds T1 and T2 any more, thereby returning control to step S41.

Thus, since the base station 1 variably controls the thresholds T1 and T2 depending on the reception error rate, the modulation-coding modes MCS#1, MCS#2, and MCS#3 can be switched depending on the change of the link quality (the reception quality of a common pilot signal (CPICH) according to the second embodiment). Therefore, the target block error rate can be satisfied, and the highest possible modulation-coding mode can be constantly selected.

According to the second embodiment, there are three modulation-coding modes. However, the number is not limited to three. That is, there also can be four or more modulation-coding modes. In this case, an optional mode can be set as a mode at the minimum transmission rate or the maximum transmission rate.

Furthermore, the variable control of a threshold can also be set at an instruction of the mobile station 2. In this case, the threshold variable control unit 15c for variably controlling a threshold depending on the reception error rate of information blocks is provided in the mobile station 2, and an instruction to raise/lower the threshold level is to be transmitted from the mobile station 2 to the base station 1.

Figure 12:
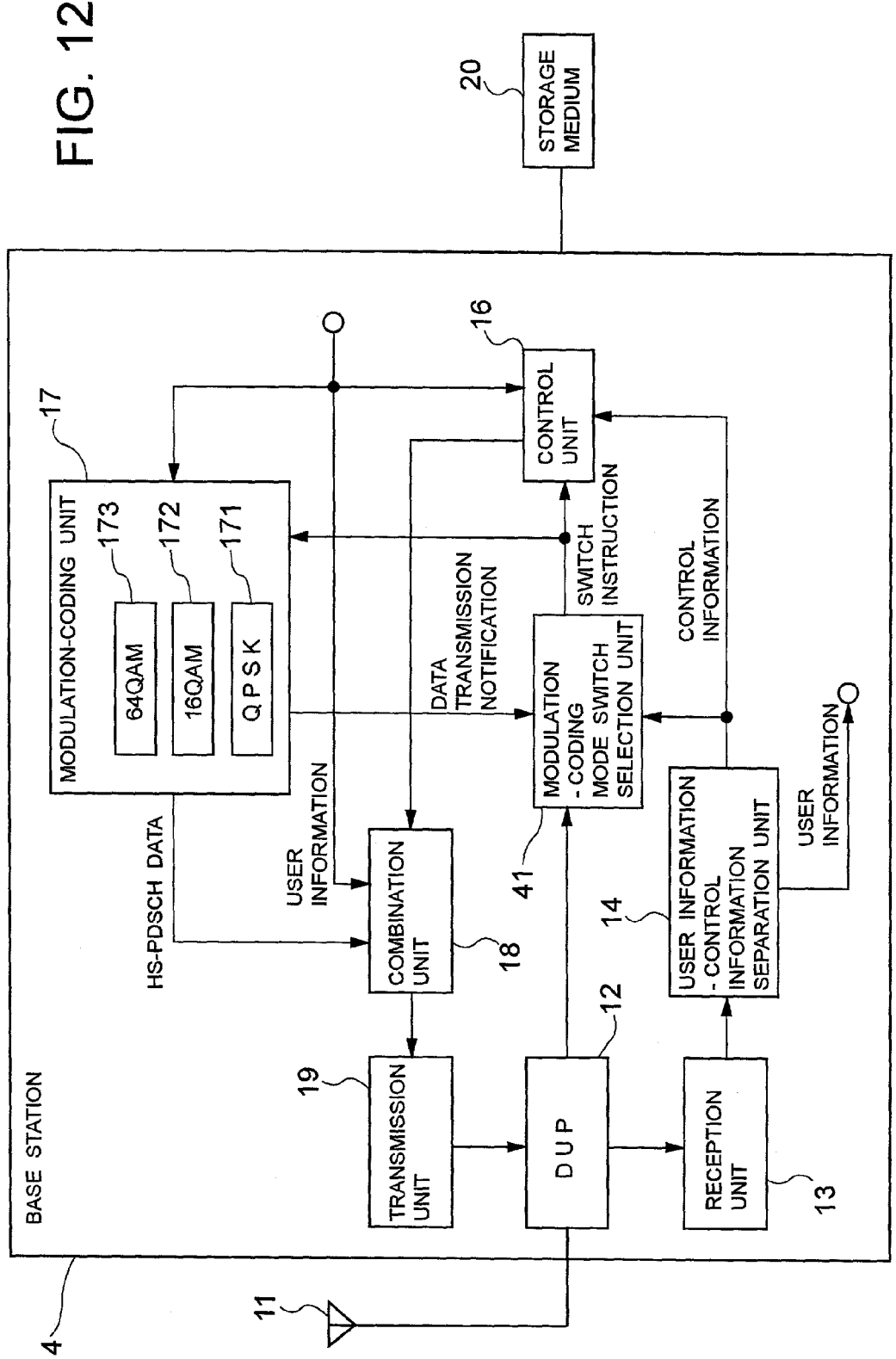
FIG. 12 is a block diagram of the configuration of the base station according to the third embodiment of the present invention.

FIG. 12 is a block diagram of the configuration of the base station according to the third embodiment of the present invention In FIG. 12, the third embodiment of the present invention has the same configuration as the base station 1 according to the first embodiment of the present invention shown in FIG. 2 except that a modulation-coding mode switch selection unit 41 having the function of measuring transmission power of an individual signal of a DPCH(DL) from the duplexer 12 is provided for a base station 4, and the same component is assigned the same reference numeral. The operation of the same component is the same as according to the first embodiment.

The modulation-coding mode switch selection unit 41 measures the transmission power of the individual signal transmitted from the base station 4 to the mobile station 2, determines which modulation-coding mode is to be selected based on the measurement result, and transmits a switch instruction into the modulation-coding mode to the control unit 16 and the modulation-coding unit 17.

Figure 13:
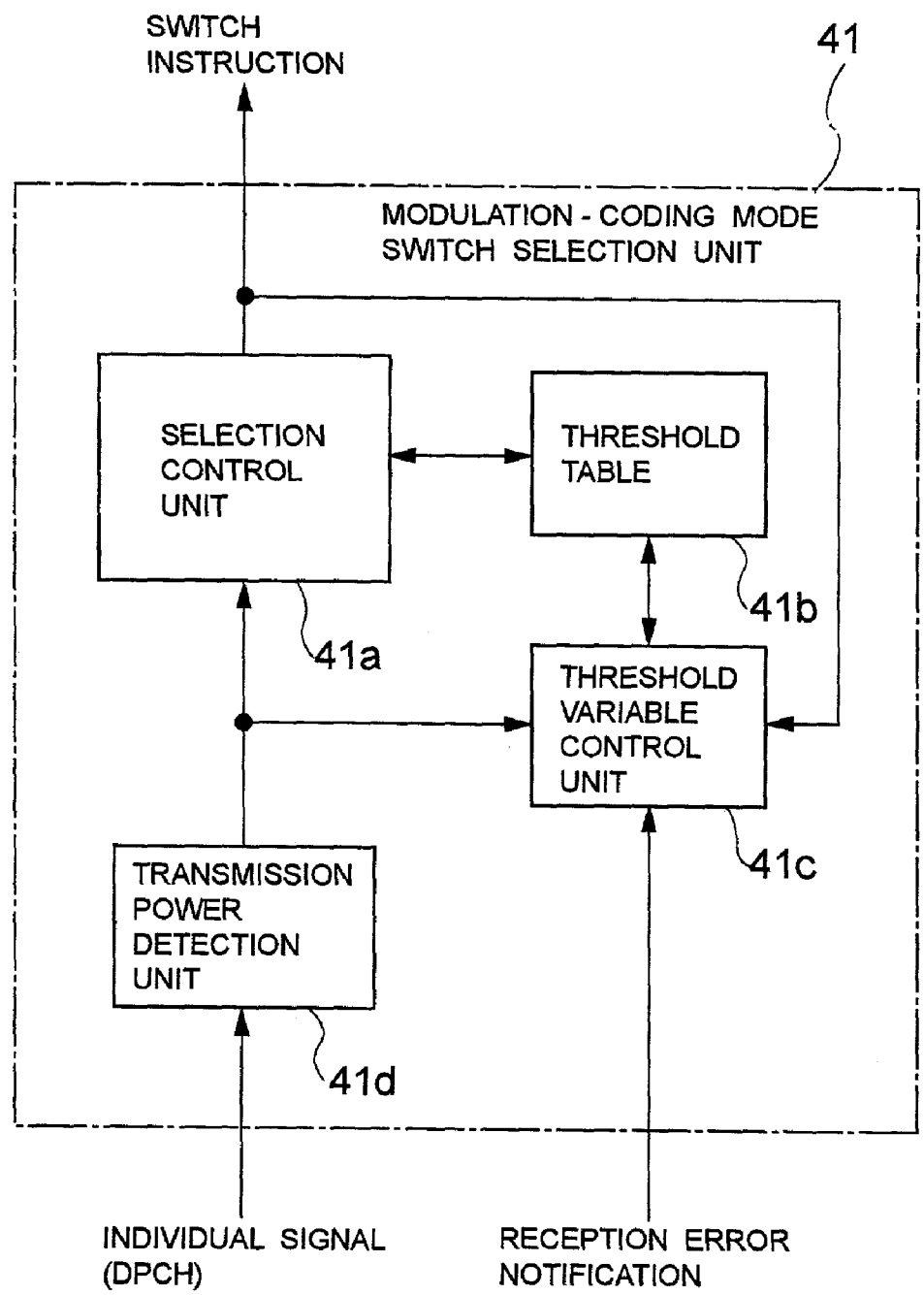
FIG. 13 is a block diagram of the configuration of the modulation-coding mode switch selection unit shown in FIG. 12.

FIG. 13 is a block diagram of the configuration of the modulation-coding mode switch selection unit 41 shown in FIG. 12. In FIG. 13, the modulation-coding mode switch selection unit 41 comprises a selection control unit 41a, a threshold table 41b, a threshold variable control unit 41c, and a transmission power detection unit 41d.

The transmission power detection unit 41d measures the transmission power of the individual signal to the mobile station 2, and notifies the selection control unit 41a and the threshold variable control unit 41c of the measurement result. The selection control unit 41a compares the measurement result of the transmission power detection unit 41d with a plurality of thresholds stored in the threshold table 41b, determines which modulation-coding mode is to be selected, and outputs the determined contents as a switch instruction. In this case, the selection control unit 41a specifies 'no change' if the selected modulation-coding mode is the same as in the previous process.

The threshold variable control unit 41c variably controls a plurality of thresholds stored in the threshold table 41b based on the contents of the reception error notification from the mobile station 2 separated by the user information-control information separation unit 14. That is, the threshold variable control unit 41c lowers the threshold level of the range of the link quality corresponding to the currently used modulation-coding mode by a predetermined value of $P_{down}$ dB when the information block is successfully received at the mobile staion 2, and raises the above mentioned threshold level by a predetermined value of $P_{up}$ dB when the information block is not successfully received a predetermined number of times. In this case, the threshold variable control unit 41c simultaneously raises and lowers all thresholds corresponding to the modulation-coding modes.

Although not shown in the attached drawings, the third embodiment of the present invention has the same configuration as the mobile communications system shown in FIG. 1, and the same configuration as the mobile station 2 according to the first embodiment of the present invention shown in FIG. 3. Therefore, the explanation of them is omitted here.

Figure 14:
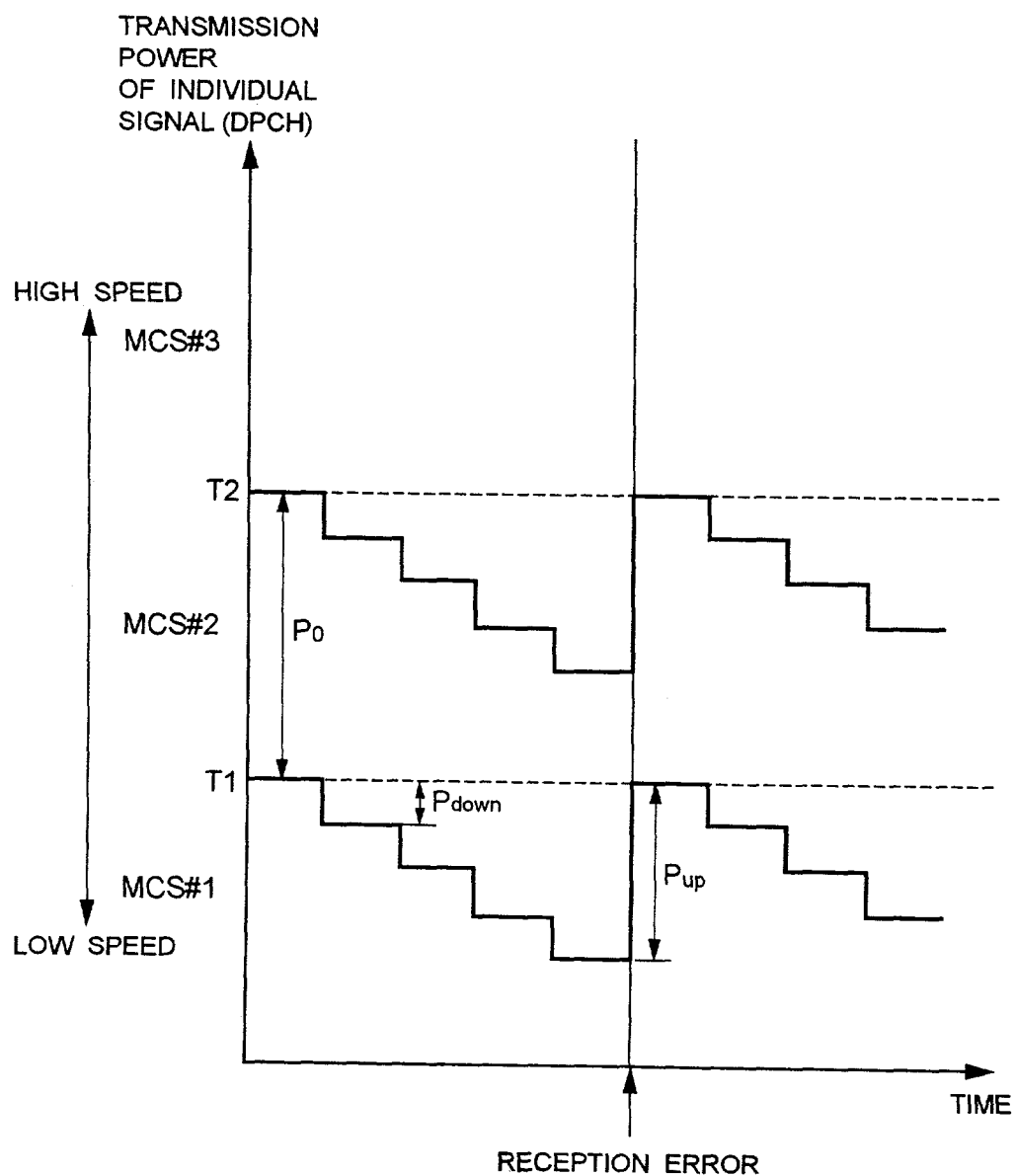
FIG. 14 shows variable control of a threshold for use in switching modulation-coding modes by the threshold variable control unit shown in FIG. 13.
Figure 15:
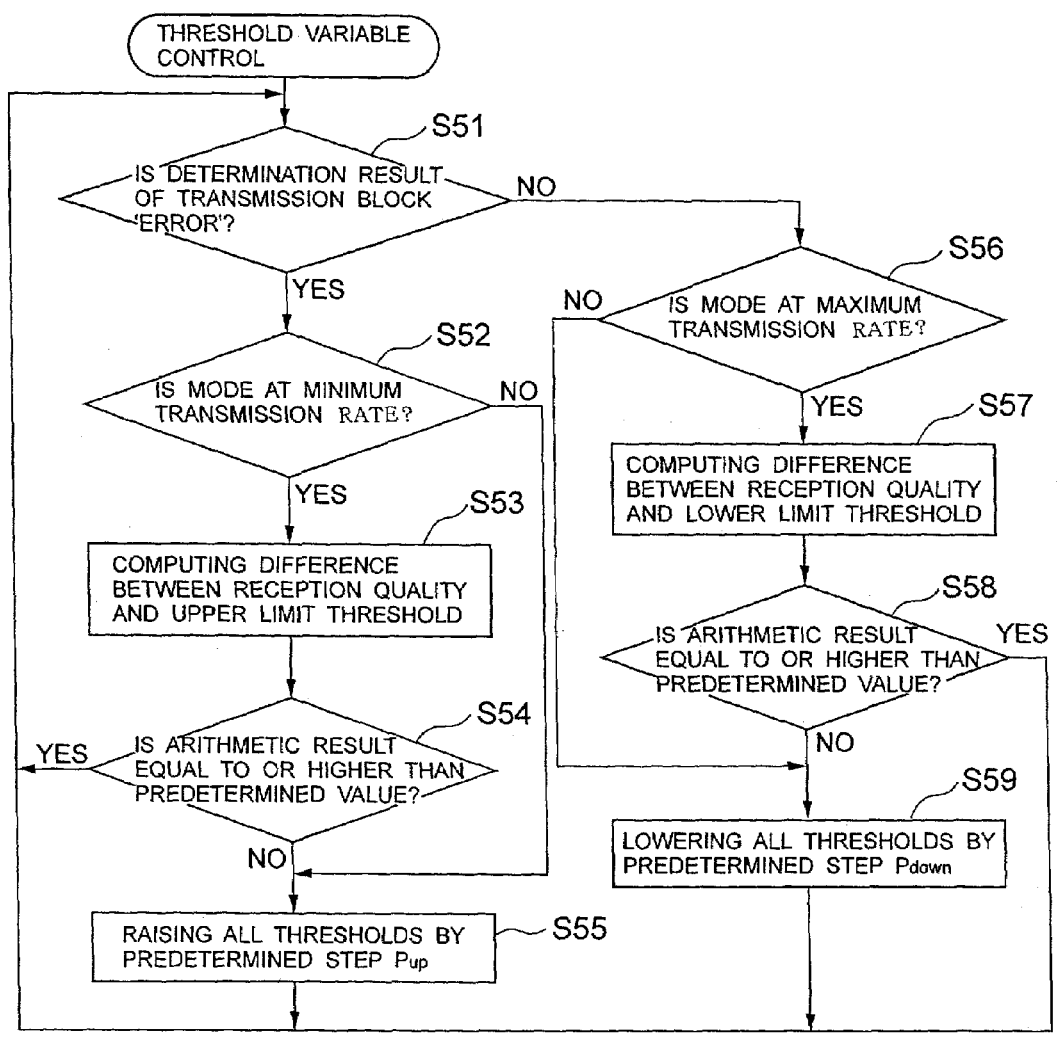
FIG. 15 is a flowchart of the variable control of a threshold for use in switching modulation-coding modes by the threshold variable control unit shown in FIG. 13.

FIG. 14 shows the variable control of the threshold for use in switching modulation-coding modes by the threshold variable control unit 41c shown in FIG. 13. FIG. 15 is a flowchart of the variable control of the threshold for use in switching modulation-coding modes by the threshold variable control unit 41c shown in FIG. 13. The operation of the variable control of the threshold for use in switching modulation-coding modes by the threshold variable control unit 41c is described below by referring to FIGS. 13 to 15. In the following explanation, the threshold is represented by T1 and T2, the modulation-coding mode by MCS#1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4.

Upon receipt of the reception error notification from the mobile station 2, the threshold variable control unit 41c computes (in step S53 shown in FIG. 15) the difference between the transmission power which is the transmission power of the individual signal transmitted to the mobile station 2 and which is detected by the transmission power detection unit 41d and the upper limit threshold (for example, the upper limit threshold T1 of the modulation-coding mode MCS#1) of the currently used modulation-coding mode when the currently used modulation-coding mode is the mode at the minimum transmission rate (step S52 shown in FIG. 15) if the determination result of the transmission block is an 'error' (step S51 shown in FIG. 15).

If the arithmetic result is smaller than a predetermined value of $P_2$ (step S54 shown in FIG. 15), the threshold variable control unit 41c raises all thresholds T1 and T2 by a predetermined step $P_{up}$ (step S55 shown in FIG. 15), thereby returning control to step S51. If the arithmetic result is equal to or larger than the predetermined value of $P_2$ (step S54 shown in FIG. 15), then the threshold variable control unit 41c does not raise thresholds T1 and T2 anymore, thereby returning control to step S51.

If the currently used modulation-coding mode is not the mode at the minimum transmission rate (step S52 shown in FIG. 15), the threshold variable control unit 41c raises all thresholds T1 and T2 by the predetermined step $P_{up}$ (step S55 shown in FIG. 15), thereby returning control to step S51.

On the other hand, if the determination result of the transmission block is not an 'error' (step S51 shown in FIG. 15), then the threshold variable control unit 41c computes (in step S57 shown in FIG. 15) the difference between the transmission power of the individual signal detected by the transmission power detection unit 41d and transmitted to the mobile station 2 and the lower limit threshold (for example, the lower limit threshold T2 of the modulation-coding mode MCS#3) of the currently used modulation-coding mode when the currently used modulation-coding mode is the mode at the maximum transmission rate (step S56 shown in FIG. 15).

If the arithmetic result is smaller than a predetermined value of $P_1$ (step S58 shown in FIG. 15), the threshold variable control unit 41c lowers all thresholds T1 and T2 by a predetermined step $P_{down}$ (step S59 shown in FIG. 15), thereby returning control to step S51. If the arithmetic result is equal to or larger than the predetermined value of $P_1$ (step S58 shown in FIG. 15), then the threshold variable control unit 41c does not lower the thresholds T1 and T2 any more, thereby returning control to step S51.

If the currently used modulation-coding mode is not a mode at the maximum transmission rate (step S56 shown in FIG. 15), the threshold variable control unit 41c lowers all thresholds T1 and T2 by the predetermined step $P_{down}$ (step S59 shown in FIG. 15), thereby returning control to step S51. All thresholds T1 and T2 are raised or lowered such that they can be spaced by a predetermined value of $P_0$ as shown in FIG. 14.

Therefore, since a threshold for use in quickly switching modulation-coding modes can be set depending on the link condition according to the third embodiment of the present invention, the optimum threshold for use in selecting a modulation-coding mode can be easily set depending on the link condition.

If the transmission power of an individual signal (DPCH) is used in estimating the link quality, a larger difference from the actual link quality is output. However, according to the third embodiment, a threshold fluctuates by the difference from the actual link quality. Therefor, the difference generates no mis-selection of a modulation-coding mode, thereby quickly switching the modulation-coding mode depending on the link condition.

Furthermore, when a determination error occurs in a data block, the modulation-coding mode one level lower than the currently used mode can be immediately entered because $P_{up}$ is larger than $P_{down}$. Therefore, although the link quality is lowered, continuous block errors can be prevented, thereby enhancing the throughput of the system.

According to the third embodiment, there are three modulation-coding modes. However, the number is not limited to three. That is, there also can be four or more modulation-coding modes. In this case, an optional mode can be set as a mode at the minimum transmission rate or the maximum transmission rate.

Although not shown in the attached drawings, the third embodiment can perform the same control as the variable control of a threshold for use in switching modulation-coding modes shown in FIG. 7, and can also perform the control using the block error rate according to the second embodiment of the present invention.

It is also possible to raise a threshold when occurrence of a reception error is detected n times (n indicates an integer equal to or larger than 1), and lower the threshold when occurrence of a reception error is not detected m times (m indicates an integer expressed by n<m) continuously.

Figure 16:
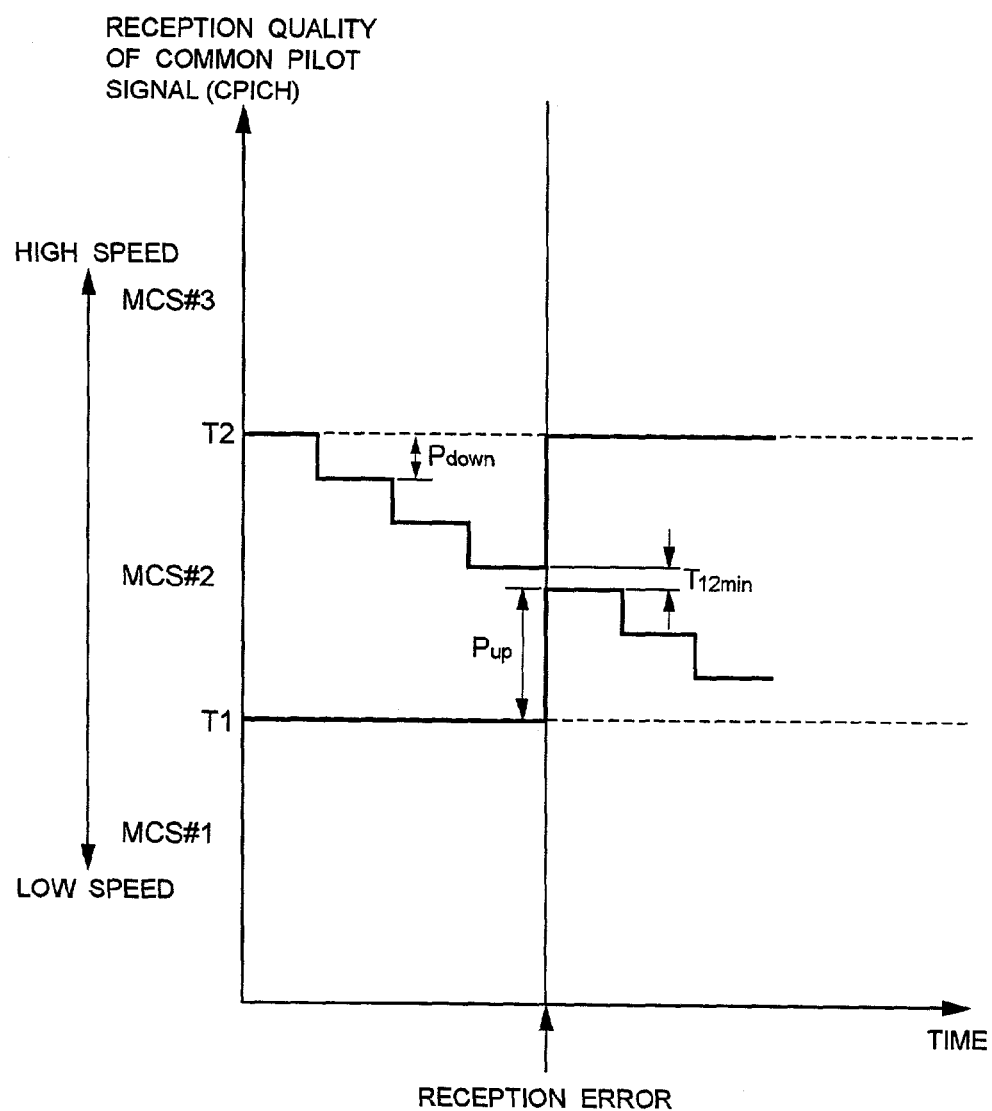
FIG. 16 shows variable control of a threshold by the threshold variable control unit according to the fourth embodiment of the present invention.
Figure 17:
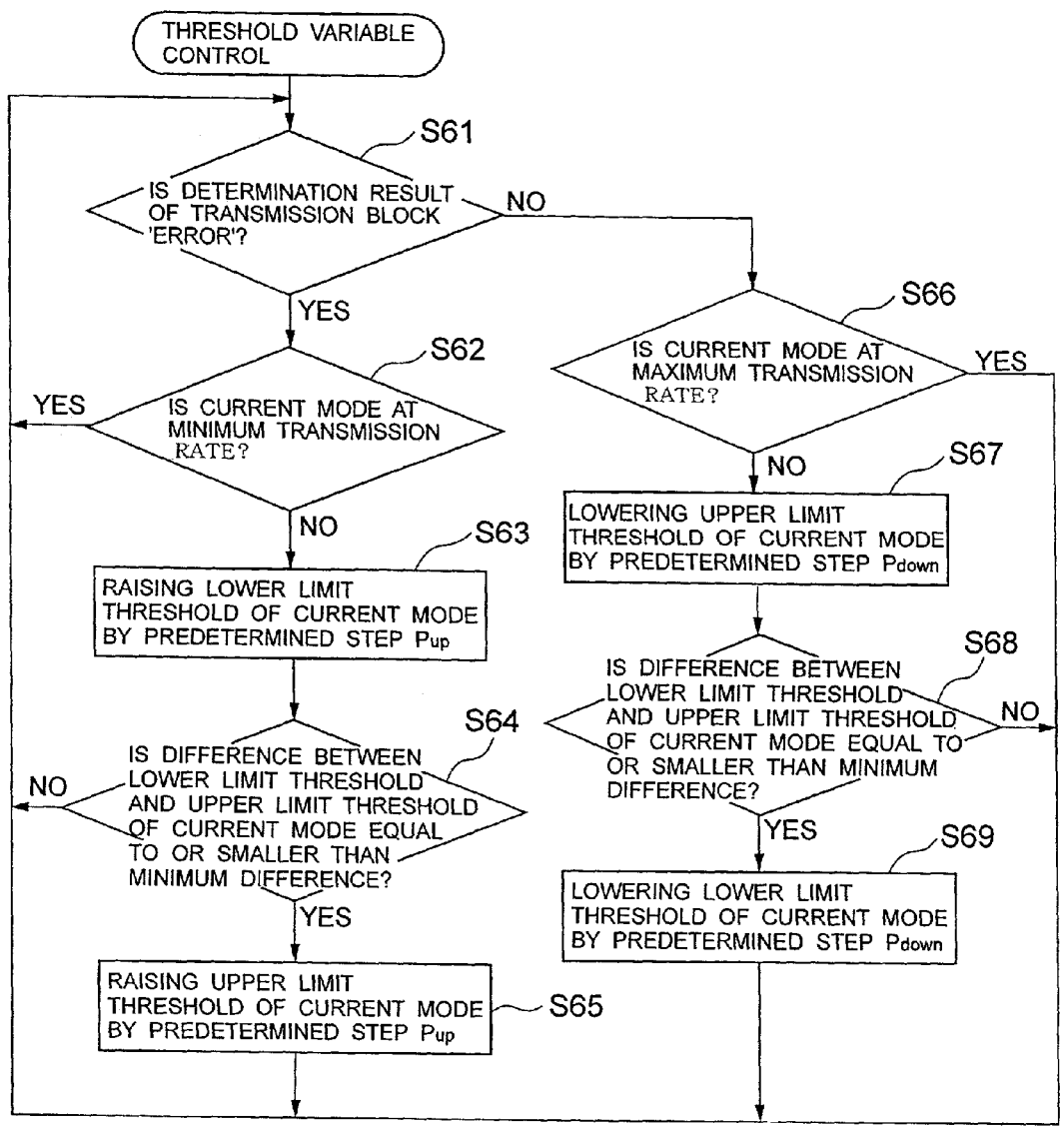
FIG. 17 is a flowchart of variable control of a threshold by the threshold variable control unit according to the fourth embodiment of the present invention.

FIG. 16 shows the variable control of a threshold in the threshold variable control unit according to the fourth embodiment of the present invention. FIG. 17 is a flowchart of variable control of a threshold in the threshold variable control unit according to the fourth embodiment of the present invention. The variable control of a threshold for use in switching modulation-coding modes in the threshold variable control unit according to the fourth embodiment of the present invention is described below by referring to FIGS. 16 and 17. In the following explanation, the threshold is represented by T1 and T2, the modulation-coding mode by MCS#1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4.

Although not shown in the attached drawings, the fourth embodiment of the present invention has the same configuration as the mobile communications system shown in FIG. 1, and has the same configurations as the base station 1 according to the first embodiment of the present invention shown in FIG. 2, the mobile station 2 according to the first embodiment of the present invention shown in FIG. 3, and the modulation-coding mode switch selection unit 15 according to the first embodiment of the present invention shown in FIG. 4. Therefore, the explanation of them is omitted here.

Upon receipt of a reception error notification from the mobile station 2, the threshold variable control unit 15c of the modulation-coding mode switch selection unit 15 raises the lower limit threshold of the currently used modulation-coding mode (for example, the lower limit threshold T1 of the modulation-coding mode MCS#2) by a predetermined step $P_{up}$ (step S63 shown in FIG. 17) if the determination result of a transmission block is an 'error' (step S61 shown in FIG. 17), and the currently used modulation-coding mode is not a mode at the minimum transmission rate (step S62 shown in FIG. 17).

At this time, the threshold variable control unit 15c raises the upper limit threshold of the currently used modulation-coding mode by the predetermined step $P_{up}$ (step S65 shown in FIG. 17) if the difference between the lower limit threshold and the upper limit threshold (upper limit threshold T2) of the currently used modulation-coding mode is equal to or lower than the minimum difference ($T_{12min}$ shown in FIG. 16) (step S64 shown in FIG. 17), thereby returning control to step S61.

If the currently used modulation-coding mode is a mode at the minimum transmission rate (step S62 shown in FIG. 17), or the difference between the lower limit threshold and the upper limit threshold of the currently used modulation-coding mode is higher than the minimum difference (step S64 shown in FIG. 17), then the threshold variable control unit 15c does not raise the threshold T1, T2 any more, returning control to step S61.

On the other hand, if the determination result is not an 'error' (step S61 shown in FIG. 17) and the currently used modulation-coding mode is not a mode at the maximum transmission rate (step S66 shown in FIG. 17), then the threshold variable control unit 15c lowers the upper limit threshold (for example, the upper limit threshold T2 of the modulation-coding mode MCS#2) of the currently used modulation-coding mode by a predetermined step $P_{down}$ (step S67 shown in FIG. 17).

Also in this case, the threshold variable control unit 15c lowers the lower limit threshold of the currently used modulation-coding mode by the predetermined step $P_{down}$ (step S69 shown in FIG. 17) if the difference between the lower limit threshold (lower limit threshold T1) and the upper limit threshold of the currently used modulation-coding mode is equal to or lower than the minimum difference ($T_{12min}$ shown in FIG. 16) (step S68 shown in FIG. 17), thereby returning control to step S61.

If the currently used modulation-coding mode is a mode at the maximum transmission rate (step S66 shown in FIG. 17), or the difference between the lower limit threshold and the upper limit threshold of the currently used modulation-coding mode is higher than the minimum difference (step S68 shown in FIG. 17), then the threshold variable control unit 15c does not lower the threshold T1, T2 any more, returning control to step S61.

Thus, since the thresholds T1 and T2 are variably controlled depending on the presence/absence of the occurrence of an information block, the modulation-coding modes MCS#1, MCS#2, and MCS#3 can be switched depending on the change of the link quality (the reception quality of a common pilot signal (CPICH) according to the fourth embodiment).

Since each of the thresholds T1 and T2 is variably controlled independently, the optimum modulation-coding mode can be quickly selected after a change of the link condition.

In addition, since the width ($P_{down}$ and $P_{up}$) of the variable control of the threshold is set based on the target block error rate in the base station 1, the target block error rate can be attained.

Therefore, since a threshold for use in quickly switching modulation-coding modes can be set depending on the link condition according to the fourth embodiment of the present invention, the optimum threshold for use in selecting a modulation-coding mode can be easily set depending on the link condition.

According to the fourth embodiment, there are three modulation-coding modes. However, the number is not limited to three. That is, there also can be four or more modulation-coding modes. Furthermore, the variable control of a threshold can also be set at an instruction of the mobile station 2. In this case, the threshold variable control unit 15c for variably controlling a threshold depending on the presence/absence of the occurrence of a reception error of an information block is provided in the mobile station 2, and an instruction to raise/lower the threshold level is to be transmitted from the mobile station 2 to the base station 1.

Furthermore, although the reception quality of a common pilot signal is used for measuring the link quality according to the fourth embodiment, the value based on the transmission power of an individual signal controlled by the high-speed closed loop transmission power control can also be used as link quality as in the third embodiment of the present invention.

It is also possible to raise a threshold when the reception error occurs n times (n is an integer equal to or larger than 1), and lower it when no reception error occurs continuously m times (m is an integer, and n<m).

Figure 18:
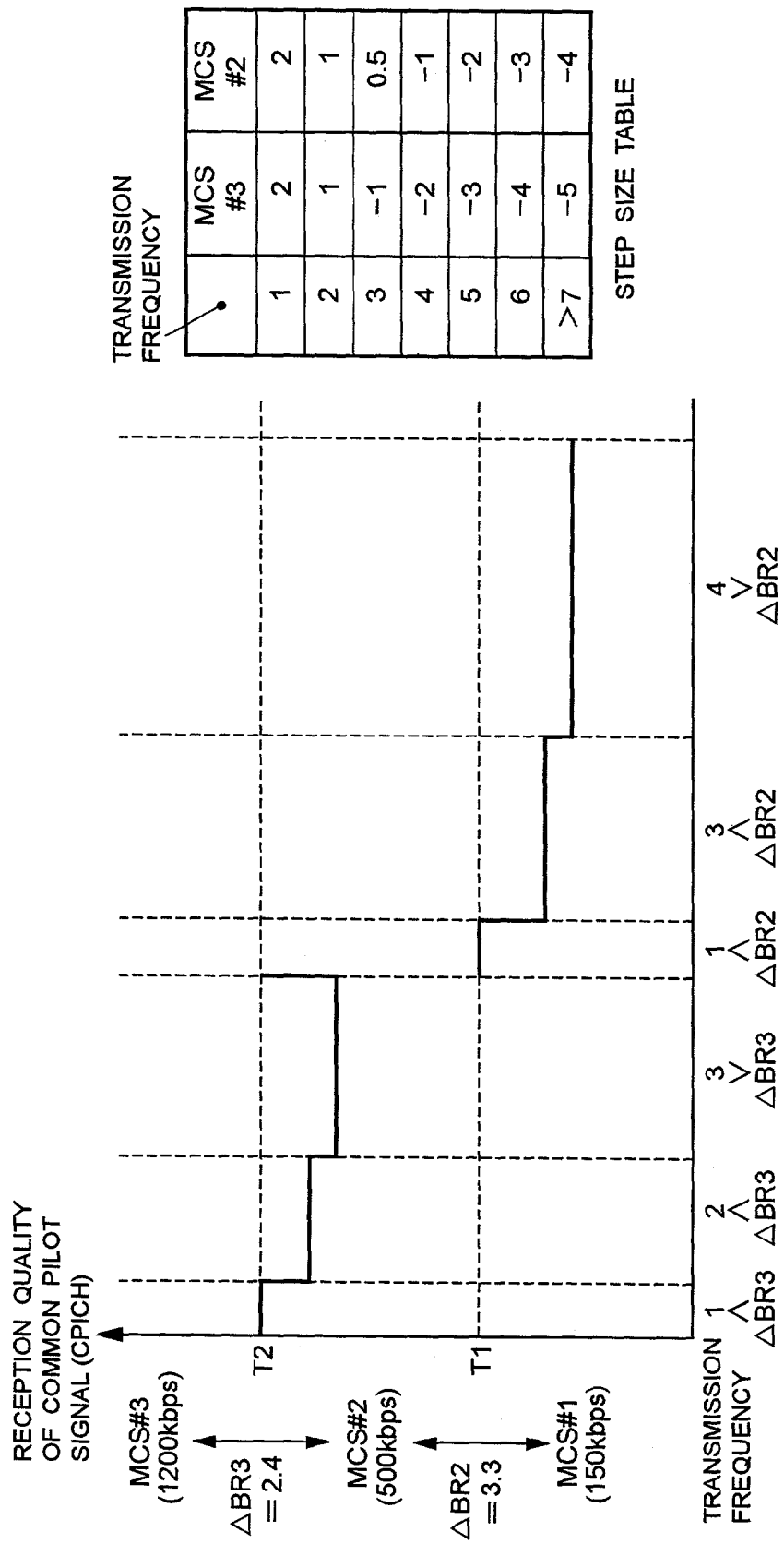
FIG. 18 shows variable control of a threshold by the threshold variable control unit according to the fifth embodiment of the present invention.
Figure 19:
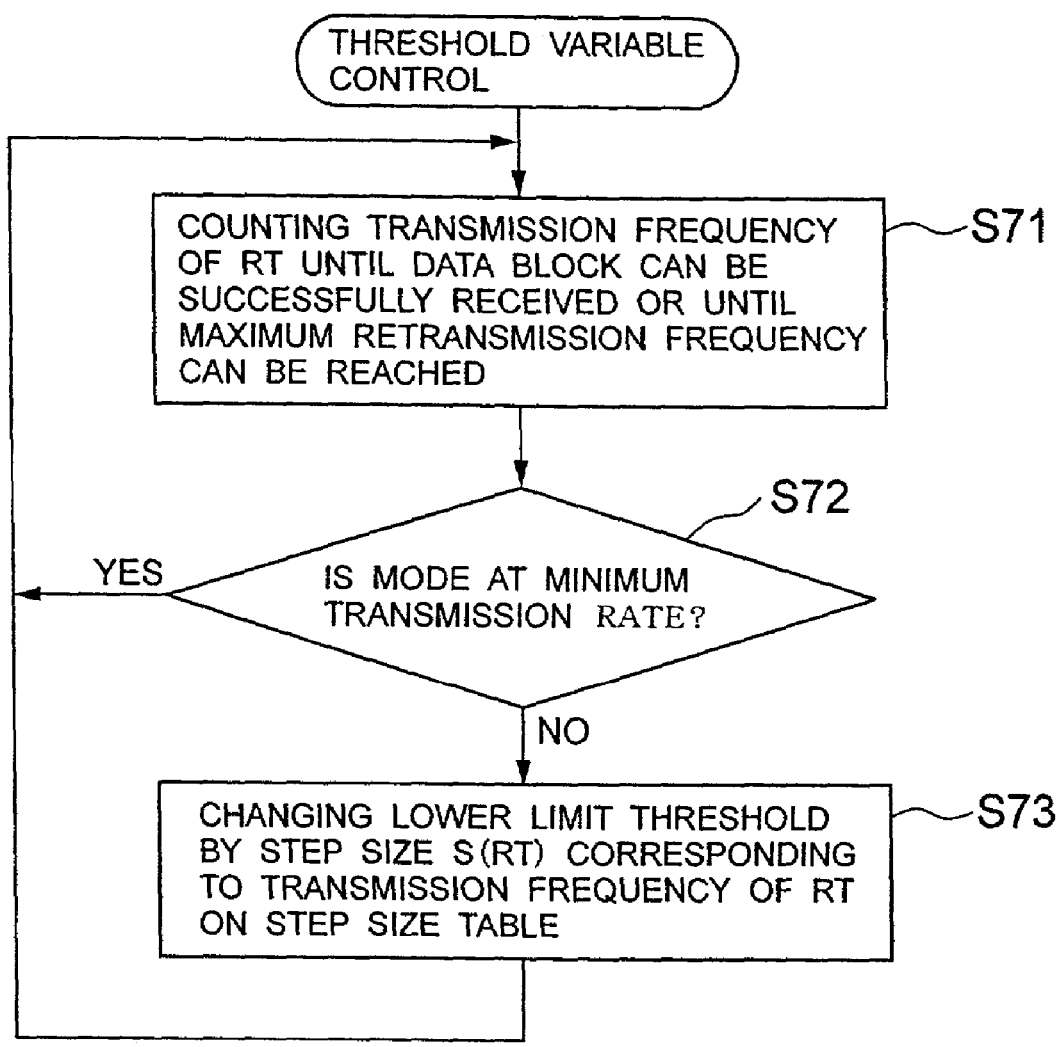
FIG. 19 is a flowchart of variable control of a threshold by the threshold variable control unit according to the fifth embodiment of the present invention.

FIG. 18 shows the variable control of a threshold in the threshold variable control unit according to the fifth embodiment of the present invention. FIG. 19 is a flowchart of the variable control of a threshold in the threshold variable control unit according to the fifth embodiment of the present invention. The variable control of a threshold for use in switching modulation-coding modes in the threshold variable control unit according to the fifth embodiment of the present invention is described below by referring to FIGS. 18 and 19.

In the following explanation, the threshold is represented by T1 and T2, the modulation-coding mode by MCS#1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4. The information bit rates for transmission in the respective modulation-coding modes are 1200 kbps, 500 kbps, and 150 kbps.

Although not shown in the attached drawings, the fifth embodiment of the present invention has the same configuration as the mobile communications system shown in FIG. 1, and has the same configurations as the base station 1 according to the first embodiment of the present invention shown in FIG. 2, the mobile station 2 according to the first embodiment of the present invention shown in FIG. 3, and the modulation-coding mode switch selection unit 15 according to the first embodiment of the present invention shown in FIG. 4. Therefore, the explanation of them is omitted here.

Upon receipt of a reception error notification from the mobile station 2, the threshold variable control unit 15c of the modulation-coding mode switch selection unit 15 counts the transmission frequency RT (the number of times of the transmission of a transmission block) until it is determined that the transmission block has been correctly transmitted or until the transmission frequency RT reaches a predetermined maximum retransmission frequency (step S71 shown in FIG. 19).

If the currently used modulation-coding mode is not a mode at the minimum transmission rate (step S72 shown in FIG. 19), then the lower limit threshold (for example, the lower limit threshold T1 of the modulation-coding mode MCS#2) of the currently used modulation-coding mode in determining the modulation-coding mode for transmission of the next block is lowered by a corresponding value [step size S(RT) corresponding to the transmission frequency RT] in the step size table (step S73 shown in FIG. 19).

At this time, the value of the step size table is set smaller with a higher transmission frequency RT. In addition, assuming that the ratio of the information bit rate BR1 in the currently used modulation-coding mode to the information bit rate BR2 in the modulation-coding mode one level lower than the currently used mode is ΔBR=BR1/BR2, the step size corresponding to the RT whose transmission frequency RT is expressed by RT>ΔBR is set to a negative value. That is, in this case, the lower limit threshold of the currently used modulation-coding mode is raised by an absolute value of the corresponding step size.

With the above mentioned control, according to the fifth embodiment of the present invention, a threshold for use in switching modulation-coding modes can be quickly set depending on the link condition. Therefore, the optimum threshold for use in switching modulation-coding modes can be easily set depending on the link condition.

Furthermore, according to the fifth embodiment, the optimum threshold can be set such that a high-speed transmission can be realized including a block retransmission time by controlling the threshold depending on the transmission frequency until a block can be successfully received at the mobile station 2 and the information bit rate change ratio obtained by lowering the modulation-coding mode level by one.

According to the fifth embodiment, there are three modulation-coding modes. However, the number is not limited to three. That is, there also can be four or more modulation-coding modes. Furthermore, the variable control of a threshold can also be set at an instruction of the mobile station 2. In this case, the threshold variable control unit 15c for variably controlling a threshold depending on the presence/absence of the occurrence of a reception error of an information block is provided in the mobile station 2, and an instruction to raise/lower the threshold level is to be transmitted from the mobile station 2 to the base station 1.

Furthermore, although the reception quality of a common pilot signal (CPICH) is used for measuring the link quality according to the fifth embodiment, the value based on the transmission power of an individual signal (DPCH) controlled by the high-speed closed loop transmission power control can also be used as link quality as in the third embodiment of the present invention.

Figure 20:
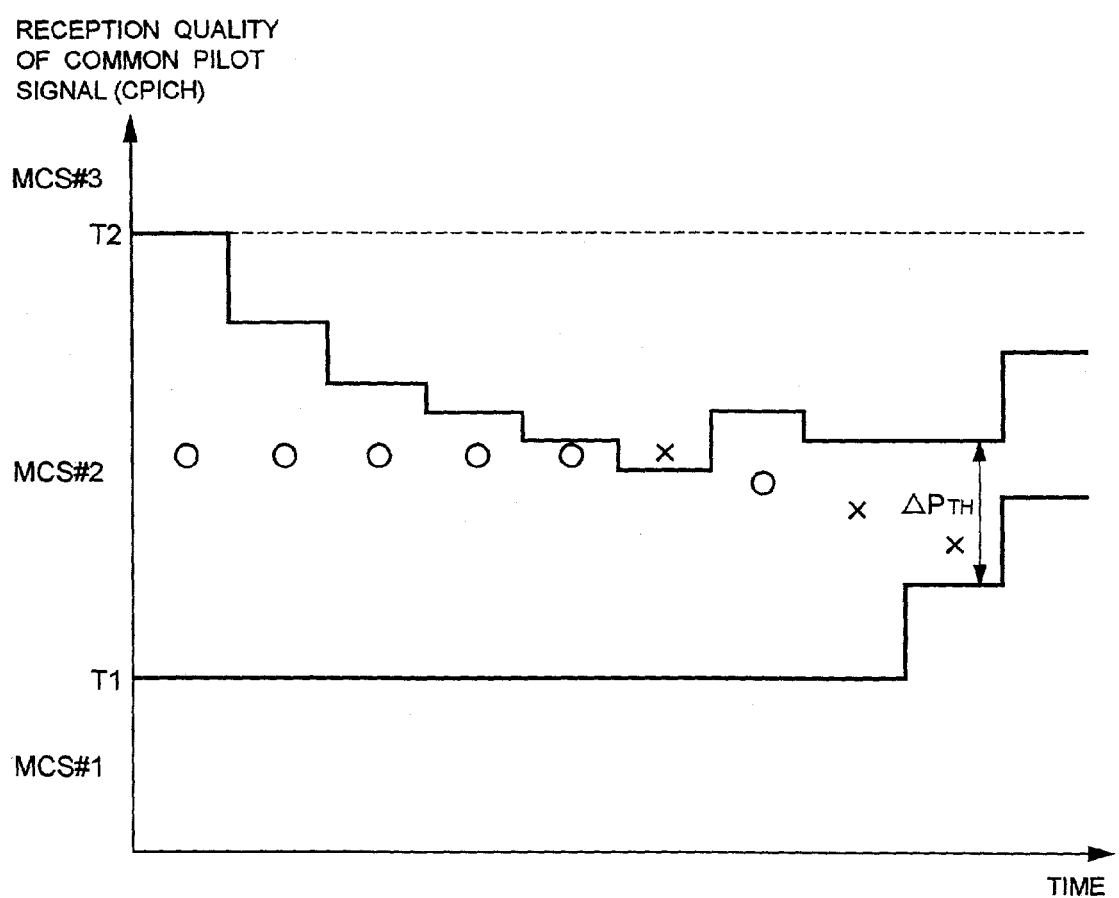
FIG. 20 shows variable control of a threshold by the threshold variable control unit according to the sixth embodiment of the present invention.
Figure 21:
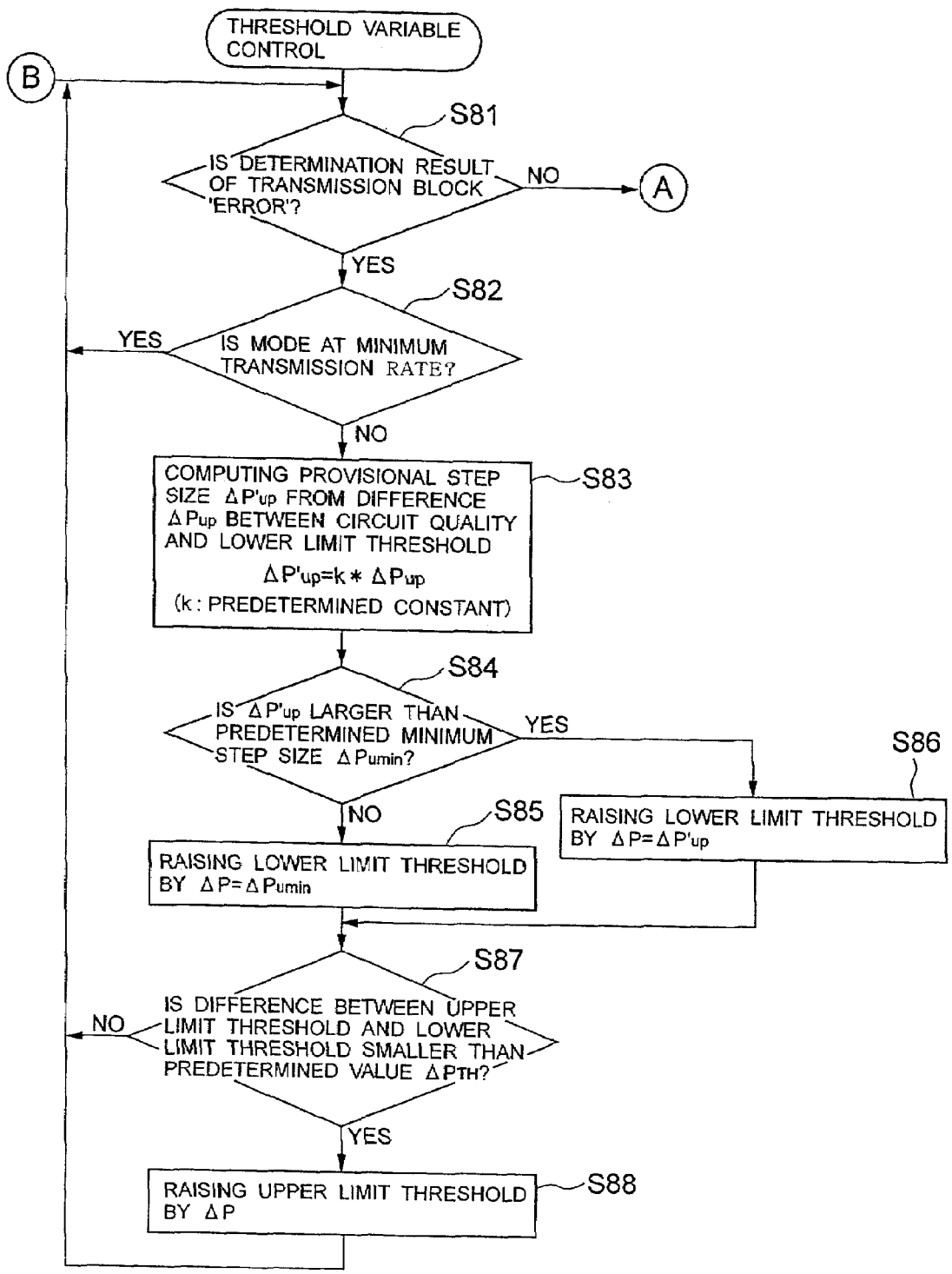
FIG. 21 is a flowchart of variable control of a threshold by the threshold variable control unit according to the sixth embodiment of the present invention.
Figure 22:
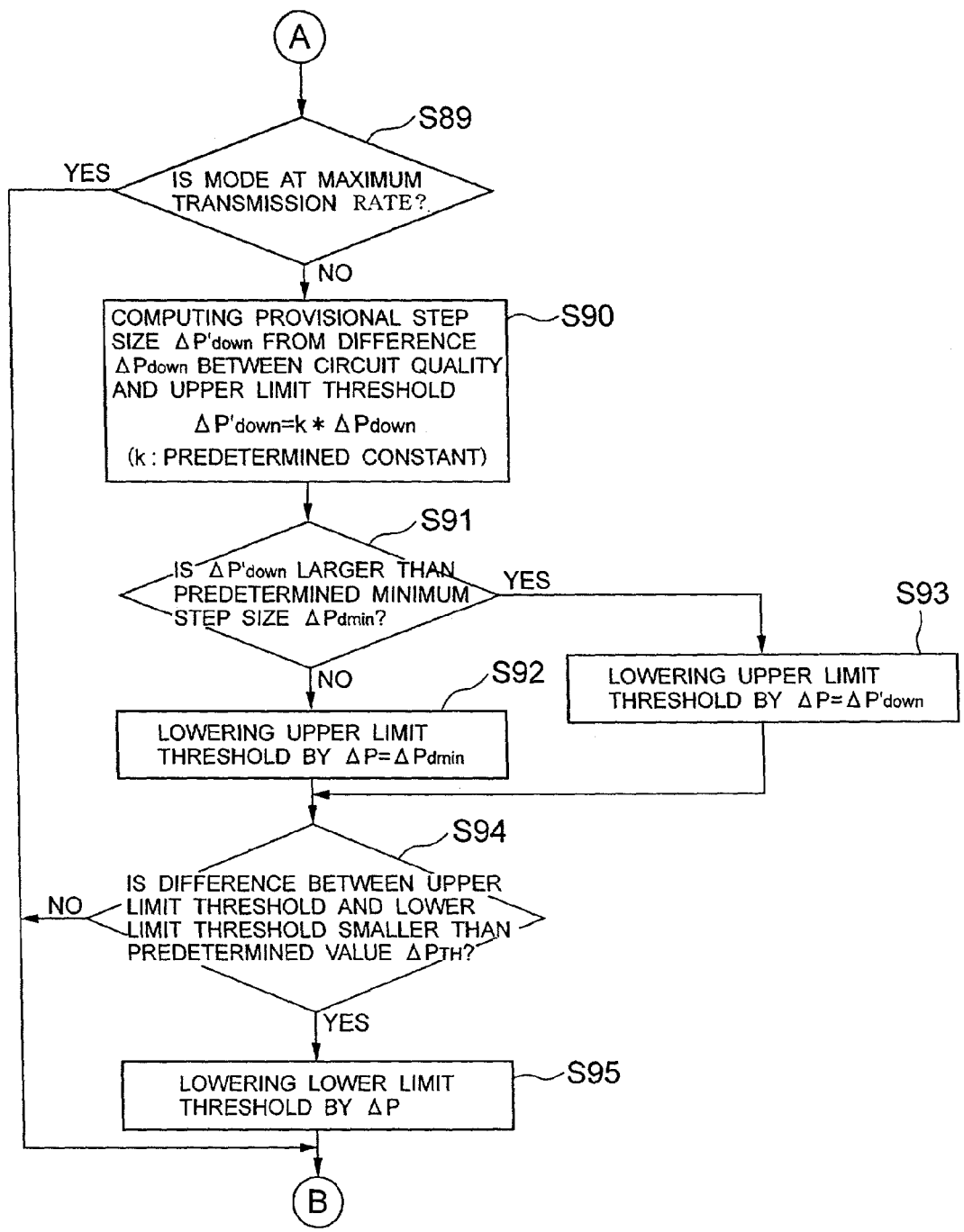
FIG. 22 is a flowchart of variable control of a threshold by the threshold variable control unit according to the sixth embodiment of the present invention.

FIG. 20 shows the variable control of a threshold in the threshold variable control unit according to the sixth embodiment of the present invention. FIGS. 21 and 22 are flowcharts of the variable control of a threshold in the threshold variable control unit according to the sixth embodiment of the present invention. The variable control of a threshold for use in switching modulation-coding modes in the threshold variable control unit according to the sixth embodiment of the present invention is described below by referring to FIGS. 20 to 22.

In the following explanation, the threshold is represented by T1 and T2, the modulation-coding modes by MCS#1, MCS#2, and MCS#3. These modulation-coding modes MCS#1, MCS#2, and MCS#3 respectively correspond to the above mentioned QPSK with R=1/2, 16QAM with R=3/4, and 64QAM with R=3/4.

Although not shown in the attached drawings, the sixth embodiment of the present invention has the same configuration as the mobile communications system shown in FIG. 1, and has the same configurations as the base station 1 according to the first embodiment of the present invention shown in FIG. 2, the mobile station 2 according to the first embodiment of the present invention shown in FIG. 3, and the modulation-coding mode switch selection unit 15 according to the first embodiment of the present invention shown in FIG. 4. Therefore, the explanation of them is omitted here.

Upon receipt of a reception error notification from the mobile station 2, the threshold variable control unit 15c of the modulation-coding mode switch selection unit 15 computes the provisional step size $\Delta P'_{up}$ from the difference $\Delta P_{up}$ between the link quality and the lower limit threshold of the currently used modulation-coding mode by the following equation ① (step S83 shown in FIG. 21) if the determination result of a transmission block is an 'error' (step S81 shown in FIG. 21), and the currently used modulation-coding mode is not a mode at the minimum transmission rate (step S82 shown in FIG. 21).

$$\Delta P'_{up} = k * \Delta P_{up} \quad \text{①}$$

where k indicates a predetermined constant.

If the computed $\Delta P'_{up}$ is smaller than a predetermined minimum step size $\Delta P_{umin}$ (step S84 shown in FIG. 21), then the lower limit threshold is raised by $\Delta P = \Delta P'_{umin}$ (step S85 shown in FIG. 21). If the computed $\Delta P'_{up}$ is larger than the predetermined minimum step size $\Delta P_{umin}$ (step S84 shown in FIG. 21), then the lower limit threshold is raised by $\Delta P = \Delta P'_{up}$ (step S86 shown in FIG. 21).

Assuming that a predetermined minimum increase step size is $U_{min}$, the difference between the current link quality and the lower limit threshold of the currently used modulation-coding mode is $\Delta Q$, and the coefficient from 0 to 1 is r2, then the step size in the above mentioned control can be computed by the following equation ②.

$$\Delta Up = \max [U_{min}, r2 \cdot \Delta Q] \quad \text{②}$$

In this case, the steps S83 and S84 are expressed by one equation. In steps S85 and S86, the lower limit threshold is raised by the value of ΔUp obtained by the equation ②.

At this time, the threshold variable control unit 15c raises the upper limit threshold of the currently used modulation-coding mode by the predetermined step ΔP (=ΔUp) (step S88 shown in FIG. 21) if the difference between the lower limit threshold and the upper limit threshold of the currently used modulation-coding mode is equal to or lower than the minimum difference (a predetermined value of $\Delta P_{TH}$) (step S87 shown in FIG. 21), thereby returning control to step S61.

If the currently used modulation-coding mode is a mode at the minimum transmission rate (step S82 shown in FIG. 21), or the difference between the lower limit threshold and the upper limit threshold of the currently used modulation-coding mode is higher than the minimum difference (step S87 shown in FIG. 21), then the threshold variable control unit 15c does not raise the thresholds T1 and T2 any more, returning control to step S81.

On the other hand, the threshold variable control unit 15c computes the provisional step size $\Delta P'_{down}$ from the difference $\Delta P_{down}$ between the link quality and the upper limit threshold of the currently used modulation-coding mode by the following equation ③ (step S90 shown in FIG. 22) if the determination result of a transmission block is not an 'error' (step S81 shown in FIG. 21), and the currently used modulation-coding mode is not a mode at the maximum transmission rate (step S89 shown in FIG. 22).

$$\Delta P'_{down} = k * \Delta P_{down} \quad (3)$$

where k indicates a predetermined constant.

If the computed $\Delta P'_{down}$ is smaller than a predetermined minimum step size $\Delta P_{dmin}$ (step S91 shown in FIG. 22), then the upper limit threshold is lowered by $\Delta P = \Delta P'_{dmin}$ (step S92 shown in FIG. 22). If the computed $\Delta P'_{down}$ is larger than the predetermined minimum step size $\Delta P_{dmin}$ (step S91 shown in FIG. 22), then the upper limit threshold is lowered by $\Delta P = \Delta P_{dmin}$ (step S93 shown in FIG. 22).

Assuming that a predetermined minimum decrease step size is $D_{min}$, the difference between the current link quality and the upper limit threshold of the currently used modulation-coding mode is $\Delta Q$, and the coefficient from 0 to 1 is r1, then the step size in the above mentioned control can be computed by the following equation ④.

$$\Delta Down = \max [D_{min}, r1 \cdot \Delta Q] \quad (4)$$

In this case, the steps S90 and S91 are expressed by one equation. In steps S92 and S93, the upper limit threshold is lowered by the value of $\Delta Down$ obtained by the equation ④.

At this time, the threshold variable control unit 15c lowers the lower limit threshold of the currently used modulation-coding mode by the predetermined step $\Delta P$ ($=\Delta Down$)(step S95 shown in FIG. 22) if the difference between the lower limit threshold and the upper limit threshold of the currently used modulation-coding mode is equal to or lower than the minimum difference (a predetermined value of $\Delta P_{TH}$)(step S94 shown in FIG. 22), thereby returning control to step S81.

If the currently used modulation-coding mode is a mode at the maximum transmission rate (step S89 shown in FIG. 22), or the difference between the lower limit threshold and the upper limit threshold of the currently used modulation-coding mode is higher than the minimum difference (step S94 shown in FIG. 22), then the threshold variable control unit 15c does not lower the thresholds T1 and T2 any more, returning control to step S81.

Thus, since the base station 1 variably controls the thresholds T1 and T2 depending on the presence/absence of the occurrence of an error in an information block, the optimum modulation-coding mode can be selected depending on the change of the link condition.

In addition, the larger the difference between the current link quality and the threshold, the larger the step size in changing the threshold. Therefore, the optimum modulation-coding mode can be selected more quickly after the link condition changes.

Therefore, since a threshold for use in quickly switching modulation-coding modes can be set depending on the link condition according to the sixth embodiment of the present invention, the optimum threshold for use in selecting a modulation-coding mode can be easily set depending on the link condition.

According to the sixth embodiment, there are three modulation-coding modes. However, the number is not limited to three. That is, there also can be four or more modulation-coding modes. Furthermore, the variable control of a threshold can also be set at an instruction of the mobile station 2. In this case, the threshold variable control unit 15c for variably controlling a threshold depending on the presence/absence of the occurrence of a reception error of an information block is provided in the mobile station 2, and an instruction to raise/lower the threshold level is to be transmitted from the mobile station 2 to the base station 1.

Furthermore, although the reception quality of a common pilot signal (CPICH) is used for measuring the link quality according to the sixth embodiment, the value based on the transmission power of an individual signal (DPCH) controlled by the high-speed closed loop transmission power control can also be used as link quality as in the third embodiment of the present invention.

It is also possible to raise a threshold when the reception error occurs n times (n is an integer equal to or larger than 1), and lower it when no reception error occurs continuously m times (m is an integer, and n<m).

As described above, the mobile communications system according to the present invention can select any one of a plurality of modulation-coding modes used for data transmission of a unit of block between a base station controlled by a base station control device and a mobile station, and includes: measurement means for measuring link quality in the data transmission; selection means for selecting one mode from the modulation-coding modes depending on the link quality measured by the measurement means; detection means for detecting the occurrence of a reception error of each block in the data transmission; and variable control means for variably controlling a threshold used in selecting one mode from the modulation-coding modes by the selection means based on the detection result by the detection means. Therefore, the optimum threshold for use in selecting a modulation-coding mode can be easily set depending on the link condition.

Furthermore, the mobile communications system according to the present invention has the effect of setting a threshold such that a high-speed transmission can be realized including a retransmitting time by using a detection result of a reception error of retransmitted data.

In addition, the mobile communications system according to the present invention has the effect of more quickly setting the optimum threshold after the link condition has changed by changing the step size depending on the difference between the current link quality and the threshold.

What is claimed is:

1. A mobile communications system capable of selecting any one of a plurality of transmission/reception modes used for data transmission of a unit of block between a base station controlled by a base station control device and a mobile station, comprising: measurement means for measuring link quality in the data transmission; detection means for detecting the occurrence of a reception error of each block in the data transmission; selection means for selecting one mode from said transmission/reception modes depending on the link quality measured by said measurement means; and variable control means for variably controlling a threshold used in selecting one mode from said transmission/reception modes by said selection means based on the detection result by said detection means.

2. The mobile communications system according to claim 1, wherein
said variable control means lowers the threshold by a first predetermined value when said detection means does not detect the occurrence of a reception error, and raises the threshold by a second predetermined value when said detection means detects the occurrence of a reception error.

3. The mobile communications system according to claim 2, wherein said first predetermined value is smaller than said second predetermined value.

4. The mobile communications system according to claim 2, wherein
said first predetermined value and said second predetermined value are set depending on a target block error rate.

5. The mobile communications system according to claim 4, wherein
when said block error rate is 1/N, said second predetermined value is '(N−1)×first predetermined value'.

6. The mobile communications system according to claim 1, wherein
said variable control means variably controls at least one of an upper limit threshold and a lower limit threshold indicating the range of the currently used transmission/reception mode based on the detection result by said detection means.

7. The mobile communications system according to claim 6, wherein
said variable control means variably controls said upper limit threshold and said lower limit threshold simultaneously.

8. The mobile communications system according to claim 7, wherein
said variable control means performs variable control such that a difference between said upper limit threshold and said lower limit threshold can be maintained.

9. The mobile communications system according to claim 6, wherein
said variable control means variably controls each of said upper limit threshold and said lower limit threshold independently.

10. The mobile communications system according to claim 9, wherein
said variable control means variably controls said upper limit threshold when said detection means does not detect the occurrence of a reception error, and variably controls said lower limit threshold when said detection means detects the occurrence of a reception error.

11. The mobile communications system according to claim 10, wherein
when one of said upper limit threshold and said lower limit threshold is variably controlled, and a difference between said upper limit threshold and said lower limit threshold reaches a predetermined minimum difference, said variable control means variably controls the other threshold in the same way.

12. The mobile communications system according to claim 6, wherein
when a difference between at least one of said upper limit threshold and said lower limit threshold and the current link quality becomes equal to or larger than a predetermined difference, said variable control means stops the variable control of the corresponding threshold.

13. The mobile communications system according to claim 1, wherein
said variable control means raises the threshold when said detection means detects the occurrence of a reception error n times (n is an integer equal to or larger than 1).

14. The mobile communications system according to claim 13, wherein
said variable control means lowers the threshold when said detection means does not continuously detect the occurrence of a reception error m times (m is an integer larger than n (n<m)).

15. The mobile communications system according to claim 1, wherein
said variable control means raises the threshold by a third predetermined value when a block error rate in a predetermined measurement period is larger than a target block error rate, and lowers the threshold by a fourth predetermined value when a block error rate in the predetermined measurement period is smaller than the target block error rate.

16. The mobile communications system according to claim 15, wherein
said third predetermined value is equal to said fourth predetermined value.

17. The mobile communications system according to claim 1, wherein
the reception quality of a common pilot signal measured by said mobile station is used as said link quality.

18. The mobile communications system according to claim 1, wherein
a value obtained based on transmission power of an individual signal which is transmitted from said base station to said mobile station, and is under a high-speed closed loop transmission power control is used as said link quality.

19. The mobile communications system according to claim 2, wherein
one of said first predetermined value and said second predetermined value is changed depending on a difference 'ΔQ=TH−Q' between the threshold TH which is changed by one of said first predetermined value and said second predetermined value and the current link quality Q.

20. The mobile communications system according to claim 19, wherein
said first predetermined value ΔDown is represented by $$\Delta Down = \max[D_{min}, r1 \cdot \Delta Q]$$

when a predetermined coefficient is r1 (0<r1<1), and a predetermined minimum decrease step size is $D_{min}$.

21. The mobile communications system according to claim 19, wherein
said second predetermined value ΔUp is represented by $$\Delta Up = \max[U_{min}, r2 \cdot \Delta Q]$$

when a predetermined coefficient is r2 (0<r2<1), and a predetermined minimum increase step size is $U_{min}$.

22. The mobile communications system according to claim 1, wherein
said transmission/reception mode is a modulation-coding mode.

23. A base station which is controlled by a base station control device and performs the data transmission of data divided into blocks with a mobile station by using any of a plurality of transmission/reception modes, comprising: selection means for selecting one mode from said transmission/reception modes depending on link quality in the data transmission; and variable control means for variably controlling a threshold for use in selecting one mode from said transmission/reception modes by said selection means based on the occurrence of a reception error of each block in the data transmission detected by said mobile station.

24. The base station according to claim 23, wherein
said variable control means lowers the threshold by a first predetermined value when the occurrence of a reception error is not detected, and raises the threshold by a second predetermined value when the occurrence of a reception error is detected.

25. The base station according to claim 24, wherein
said first predetermined value is smaller than said second predetermined value.

26. The base station according to claim 24, wherein
said first predetermined value and said second predetermined value are set depending on a target block error rate.

27. The base station according to claim 26, wherein
when said block error rate is 1/N, said second predetermined value is '(N−1)×first predetermined value'.

28. The base station according to claim 23, wherein
said variable control means variably controls at least one of an upper limit threshold and a lower limit threshold indicating the range of the currently used transmission/reception mode based on the presence/absence of the occurrence of a reception error.

29. The base station according to claim 28, wherein
said variable control means variably controls said upper limit threshold and said lower limit threshold simultaneously.

30. The base station according to claim 29, wherein
said variable control means performs variable control such that a difference between said upper limit threshold and said lower limit threshold can be maintained.

31. The base station according to claim 28, wherein
said variable control means variably controls each of said upper limit threshold and said lower limit threshold independently.

32. The base station according to claim 31, wherein
said variable control means variably controls said upper limit threshold when the occurrence of a reception error is not detected, and variably controls said lower limit threshold when the occurrence of a reception error is detected.

33. The base station according to claim 32, wherein
when one of said upper limit threshold and said lower limit threshold is variably controlled, and a difference between said upper limit threshold and said lower limit threshold reaches a predetermined minimum difference, said variable control means variably controls the other threshold in the same manner.

34. The base station according to claim 28, wherein
when a difference between at least one of said upper limit threshold and said lower limit threshold and the current link quality becomes equal to or larger than a predetermined difference, said variable control means stops the variable control of the corresponding threshold.

35. The base station according to claim 23, wherein
said variable control means raises the threshold when the occurrence of a reception error is detected n times (n is an integer equal to or larger than 1).

36. The base station according to claim 35, wherein
said variable control means lowers the threshold when the occurrence of a reception error is not continuously detected m times (m is an integer larger than n (n<m)).

37. The base station according to claim 23, wherein
said variable control means raises the threshold by a third predetermined value when a block error rate in a predetermined measurement period is larger than a target block error rate, and lowers the threshold by a fourth predetermined value when a block error rate in the predetermined measurement period is smaller than the target block error rate.

38. The base station according to claim 37, wherein
said third predetermined value is equal to said fourth predetermined value.

39. The base station according to claim 23, wherein
the reception quality of a common pilot signal measured by said mobile station is used as said link quality.

40. The base station according to claim 23, wherein
a value obtained based on transmission power of an individual signal which is transmitted from the base station to said mobile station, and is under a high-speed closed loop transmission power control is used as said link quality.

41. The base station according to claim 23, wherein
when the occurrence of a reception error of a block is detected, information about the block is retransmitted, and said variable control means decreases the threshold by a predetermined value $\Delta Si$ (i=0, 1, 2, ..., N) when the number of times of the retransmission until the information about the block is successfully received is i times (i is a positive integer).

42. The base station according to claim 41, wherein
said predetermined value $\Delta Si$ is determined based on a ratio $\Delta BR(=BR(k)/BR(k-1))$ of an information transmission rate $BR(k)$ in a currently used transmission/reception mode to an information transmission rate $BR(k-1)$ in a transmission/reception mode one level lower than the currently used transmission/reception mode.

43. The base station according to claim 41, wherein
the larger said number i of times of the retransmission is, the smaller said predetermined value $\Delta Si$ can be set.

44. The base station according to claim 42, wherein
when said number i of times of the retransmission is expressed by $\Delta BR<(i+1)$ as compared with said ratio $\Delta BR$, said predetermined value $\Delta Si$ is set to a negative value.

45. The base station according to claim 41, wherein
said predetermined value $\Delta Si$ is set depending on a predetermined maximum number N of times of the retransmission.

46. The base station according to claim 45, wherein
When said number i of times of the retransmission is larger then said predetermined maximum number N, said predetermined value $\Delta Si$ is set to a negative value.

47. The base station according to claim 41, wherein
said predetermined value $\Delta Si$ is set depending on a target block error rate.

48. The base station according to claim 24, wherein
one of said first predetermined value and said second predetermined value is changed depending on a difference '$\Delta Q=TH-Q$' between the threshold TH which is changed by one of said first predetermined value and said second predetermined value and the current link quality Q.

49. The base station according to claim 48, wherein
said first predetermined value $\Delta Down$ is represented by $$\Delta Down=\max[D_{min}, r1\cdot \Delta Q]$$

when a predetermined coefficient is r1 (0<r1<1), and a predetermined minimum decrease step size is $D_{min}$.

50. The base station according to claim 48, wherein
said second predetermined value $\Delta Up$ is represented by $$\Delta Up=\max[U_{min}, r2\cdot \Delta Q]$$

when a predetermined coefficient is r2 (0<r2<1), and a predetermined minimum increase step size is $U_{min}$.

51. The base station according to claim 23, wherein
said transmission/reception mode is a modulation-coding mode.

52. A mobile station to which a base station controlled by a base station control device performs the data transmission of data divided into blocks by using any of a plurality of transmission/reception modes, comprising: measurement means for measuring link quality in the data transmission; detection means for detecting the occurrence of a reception error of each block in the data transmission; selection means for selecting one mode from said transmission/reception modes depending on the link quality measured by said measurement means; and variable control means for variably controlling a threshold used in selecting one mode from said transmission/reception modes by said selection means based on the detection result by said detection means.

53. The mobile station according to claim 52, wherein said variable control means lowers the threshold by a first predetermined value when said detection means does not detect the occurrence of a reception error, and raises the threshold by a second predetermined value when said detection means detects the occurrence of a reception error.

54. The mobile station according to claim 53, wherein said first predetermined value is smaller than said second predetermined value.

55. The mobile station according to claim 53, wherein said first predetermined value and said second predetermined value are set depending on a target block error rate.

56. The mobile station according to claim 55, wherein when said block error rate is 1/N, said second predetermined value is '(N−1)×first predetermined value'.

57. The mobile station according to claim 52, wherein said variable control means variably controls at least one of an upper limit threshold and a lower limit threshold indicating the range of the currently used transmission/reception mode based on the detection result by said detection means.

58. The mobile station according to claim 57, wherein said variable control means variably controls said upper limit threshold and said lower limit threshold simultaneously.

59. The mobile station according to claim 58, wherein said variable control means performs variable control such that a difference between said upper limit threshold and said lower limit threshold can be maintained.

60. The mobile station according to claim 57, wherein said variable control means variably controls each of said upper limit threshold and said lower limit threshold independently.

61. The mobile station according to claim 60, wherein said variable control means variably controls said upper limit threshold when said detection means does not detect the occurrence of a reception error, and variably controls said lower limit threshold when said detection means detects the occurrence of a reception error.

62. The mobile station according to claim 61, wherein when one of said upper limit threshold and said lower limit threshold is variably controlled, and a difference between said upper limit threshold and said lower limit threshold reaches a predetermined minimum difference, said variable control means variably controls the other threshold in the same way.

63. The mobile station according to claim 57, wherein when a difference between at least one of said upper limit threshold and said lower limit threshold and the current link quality becomes equal to or larger than a predetermined difference, said variable control means stops the variable control of the corresponding threshold.

64. The mobile station according to claim 52, wherein said variable control means raises the threshold when said detection means detects the occurrence of a reception error n times (n is an integer equal to or larger than 1).

65. The mobile station according to claim 64, wherein said variable control means lowers the threshold when said detection means does not continuously detect the occurrence of a reception error m times (m is an integer larger than n (n<m)).

66. The mobile station according to claim 52, wherein said variable control means raises the threshold by a third predetermined value when a block error rate in a predetermined measurement period is larger than a target block error rate, and lowers the threshold by a fourth predetermined value when a block error rate in the predetermined measurement period is smaller than the target block error rate.

67. The mobile station according to claim 66, wherein said third predetermined value is equal to said fourth predetermined value.

68. The mobile station according to claim 52, wherein the reception quality of a common pilot signal measured by the mobile station is used as said link quality.

69. The mobile station according to claim 52, wherein when said detection means detects the occurrence of a reception error of a block, information about the block is retransmitted, and said variable control means decreases the threshold by a predetermined value $\Delta Si$ (i=0, 1, 2, . . . , N) when the number of times of the retransmission until the information about the block is successfully received is i times (i is a positive integer).

70. The mobile station according to claim 69, wherein said predetermined value $\Delta Si$ is determined based on a ratio $\Delta BR(=BR(k)/BR(k-1))$ of an information transmission rate $BR(k)$ in a currently used transmission/reception mode to an information transmission rate $BR(k-1)$ in a transmission/reception mode one level lower than the currently used transmission/reception mode.

71. The mobile station according to claim 70, wherein when said number i of times of the retransmission is expressed by $\Delta BR<(i+1)$ as compared with said ratio $\Delta BR$, said predetermined value $\Delta Si$ is set to a negative value.

72. The mobile station according to claim 69, wherein the larger said number i of times of the retransmission is, the smaller said predetermined value $\Delta Si$ can be set.

73. The mobile station according to claim 69, wherein said predetermined value $\Delta Si$ is set depending on a predetermined maximum number N of times of the retransmission.

74. The mobile station according to claim 73, wherein When said number i of times of the retransmission is larger than said predetermined maximum number N, said predetermined value $\Delta Si$ is set to a negative value.

75. The mobile station according to claim 69, wherein said predetermined value $\Delta Si$ is set depending on a target block error rate.

76. The mobile station according to claim 53, wherein one of said first predetermined value and said second predetermined value is changed depending on a difference '$\Delta Q=TH-Q$' between the threshold TH which is changed by one of said first predetermined value and said second predetermined value and the current link quality Q.

77. The mobile station according to claim 76, wherein said first predetermined value ΔDown is represented by $$\Delta Down = max[D_{min}, r1 \cdot \Delta Q]$$

when a predetermined coefficient is r1 (0<r1<1), and a predetermined minimum decrease step size is $D_{min}$.

78. The mobile station according to claim 76, wherein said second predetermined value ΔUp is represented by $$\Delta Up = max[U_{min}, r2 \cdot \Delta Q]$$

when a predetermined coefficient is r2 (0<r2<1), and a predetermined minimum increase step size is $U_{min}$.

79. The mobile station according to claim 52, wherein said transmission/reception mode is a modulation-coding mode.

80. A threshold setting method of a mobile communications system capable of selecting any one of a plurality of transmission/reception modes used for data transmission of a unit of block between a base station controlled by a base station control device and a mobile station, comprising the steps of: measuring link quality in the data transmission; selecting one mode from said transmission/reception modes depending on the measured link quality; detecting the occurrence of a reception error of each block in the data transmission; and controlling a variable threshold used in selecting one mode from said transmission/reception modes based on the detection result.

81. The threshold setting method according to claim 80, wherein
said transmission/reception mode is a modulation-coding mode.

82. A storage medium having recorded therein a program of a threshold setting method of a base station in a mobile communications system capable of selecting any one of a plurality of transmission/reception modes used for data transmission of a unit of block between the base station controlled by a base station control device and a mobile station,
wherein the program causes a computer to execute processing for selecting one mode from said transmission/reception modes depending on the measure result of link quality in the data transmission and processing for controlling a variable threshold used in selecting one mode from the transmission/reception modes based on the detection result of the occurrence of a reception error of each block in the data transmission.

83. The mobile communications system according to claim 1, wherein
when said detection means detects the occurrence of a reception error of a block, information about the block is retransmitted, and said variable control means decreases the threshold by a predetermined value ΔSi (i=0, 1, 2, . . . , N) when the number of times of the retransmission until the information about the block is successfully received is i times (i is a positive integer).

84. The mobile communications system according to claim 83, wherein
said predetermined value ΔSi is determined based on a ratio ΔBR(=BR(k)/BR(k−1)) of an information transmission rate BR(k) in a currently used transmission/reception mode to an information transmission rate BR(k−1) in a transmission/reception mode one level lower than the currently used transmission/reception mode.

85. The mobile communications system according to claim 83, wherein
the larger said number i of times of the retransmission is, the smaller said predetermined value ΔSi can be set.

86. The mobile communications system according to claim 84, wherein
when said number i of times of the retransmission is expressed by ΔBR<(i+1) as compared with said ratio ΔBR, said predetermined value ΔSi is set to a negative value.

87. The mobile communications system according to claim 83, wherein
said predetermined value ΔSi is set depending on a predetermined maximum number N of times of the retransmission.

88. The mobile communications system according to claim 87, wherein
when said number i of times of the retransmission is larger than said predetermined maximum number N, said predetermined value ΔSi is set to a negative value.

89. The mobile communications system according to claim 83, wherein
said predetermined value ΔSi is set depending on a target block error rate.

90. The storage medium according to claim 82, wherein
said transmission/reception mode is a modulation-coding mode.

* * * * *